(12) United States Patent
Kang et al.

(10) Patent No.: US 10,452,156 B2
(45) Date of Patent: Oct. 22, 2019

(54) MOBILE TERMINAL AND CONTROL METHOD THEREFOR

(71) Applicant: LG ELECTRONICS INC., Seoul (KR)

(72) Inventors: Jiwon Kang, Seoul (KR); Jeongyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/764,455

(22) PCT Filed: Jan. 8, 2016

(86) PCT No.: PCT/KR2016/000173
§ 371 (c)(1),
(2) Date: Mar. 29, 2018

(87) PCT Pub. No.: WO2017/057803
PCT Pub. Date: Apr. 6, 2017

(65) Prior Publication Data
US 2018/0275770 A1 Sep. 27, 2018

(30) Foreign Application Priority Data

Sep. 30, 2015 (KR) .................. 10-2015-0137481

(51) Int. Cl.
| G06F 3/03 | (2006.01) |
| G09G 5/14 | (2006.01) |
| G09G 5/36 | (2006.01) |
| G06F 3/0482 | (2013.01) |
| G06F 3/0488 | (2013.01) |
| G06F 3/02 | (2006.01) |

(Continued)

(52) U.S. Cl.
CPC .............. G06F 3/03 (2013.01); G06F 3/0221 (2013.01); G06F 3/041 (2013.01); G06F 3/0482 (2013.01);
(Continued)

(58) Field of Classification Search
CPC combination set(s) only.
See application file for complete search history.

(56) References Cited

U.S. PATENT DOCUMENTS 8,860,656 B1 * 10/2014 Cho ........................ G06F 3/041
345/102
2010/0245392 A1 9/2010 Chae et al.
(Continued)

FOREIGN PATENT DOCUMENTS

WO WO 2007/145518 A1 12/2007

*Primary Examiner* — Aneeta Yodichkas
*Assistant Examiner* — Deeprose Subedi
(74) *Attorney, Agent, or Firm* — Birch, Stewart, Kolasch & Birch, LLP

(57) ABSTRACT

The present invention relates to a mobile terminal and control method therefor. More specifically, the present invention relates to a mobile terminal for displaying various pieces of content according to the extension of the width of a flexible display, and a control method thereof. To this or another end, provided is a mobile terminal, according to one aspect of the present invention, comprising: a flexible display unit; a sensing unit for sensing an input signal and an extension length of the flexible display unit; and a control unit, wherein the control unit displays, on the flexible display unit, first content including first time information and displays, on the flexible display unit, second content including second time information if the flexible display unit is extended to a first preset length, wherein the first content and the second content are execution screens provided during an execution of the same application, and the first time information and the second time information are different from each other.

20 Claims, 31 Drawing Sheets

(51) Int. Cl.
G06F 3/041 (2006.01)
G06F 3/0485 (2013.01)
G09G 3/20 (2006.01)

(52) U.S. Cl.
CPC .......... *G06F 3/0485* (2013.01); *G06F 3/0488* (2013.01); *G09G 3/20* (2013.01); *G09G 5/14* (2013.01); *G09G 5/363* (2013.01); *G06F 2203/04102* (2013.01); *G09G 2340/0442* (2013.01); *G09G 2354/00* (2013.01); *G09G 2380/02* (2013.01)

(56) References Cited

U.S. PATENT DOCUMENTS

| | | |
|---|---|---|
| 2013/0127918 A1 | 5/2013 | Kang et al. |
| 2013/0145311 A1* | 6/2013 | Joo ................ G06F 3/04886 715/788 |
| 2013/0154971 A1 | 6/2013 | Kang et al. |
| 2013/0265257 A1* | 10/2013 | Jung ................ G06F 3/0412 345/173 |
| 2013/0275910 A1* | 10/2013 | Kim ................ G06F 3/0484 715/800 |
| 2013/0321340 A1* | 12/2013 | Seo ................ G06F 1/1641 345/174 |
| 2014/0098095 A1* | 4/2014 | Lee ................ G06F 3/041 345/420 |
| 2014/0204037 A1* | 7/2014 | Kim ................ G06F 1/1647 345/173 |
| 2014/0218375 A1* | 8/2014 | Kim ................ G06F 3/147 345/501 |
| 2014/0375702 A1* | 12/2014 | Cho ................ G06F 1/3265 345/690 |
| 2016/0259514 A1* | 9/2016 | Sang ................ G06F 3/04817 |

* cited by examiner

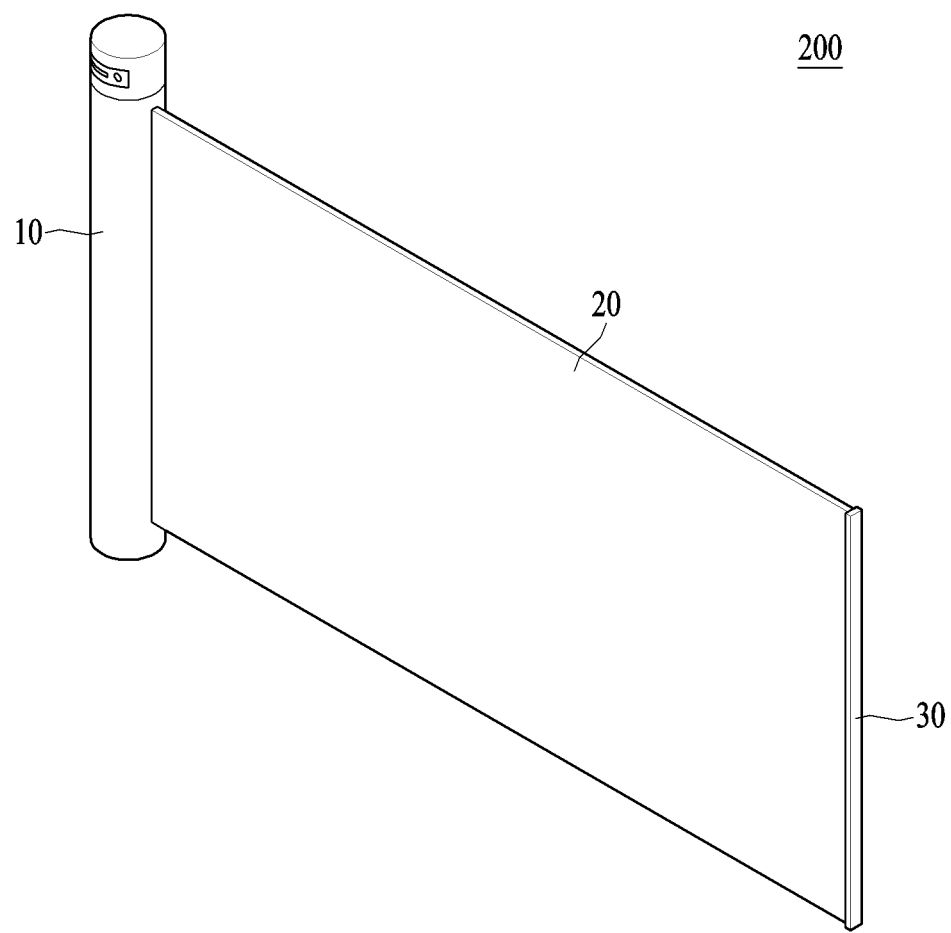

FIG. 8
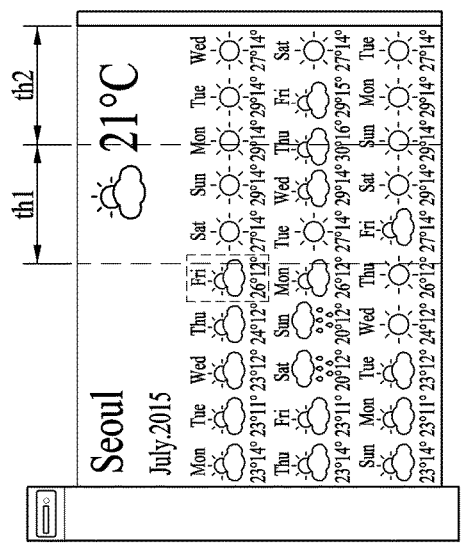
(a)
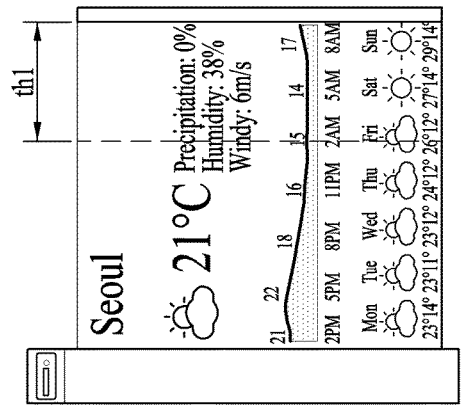
(b)
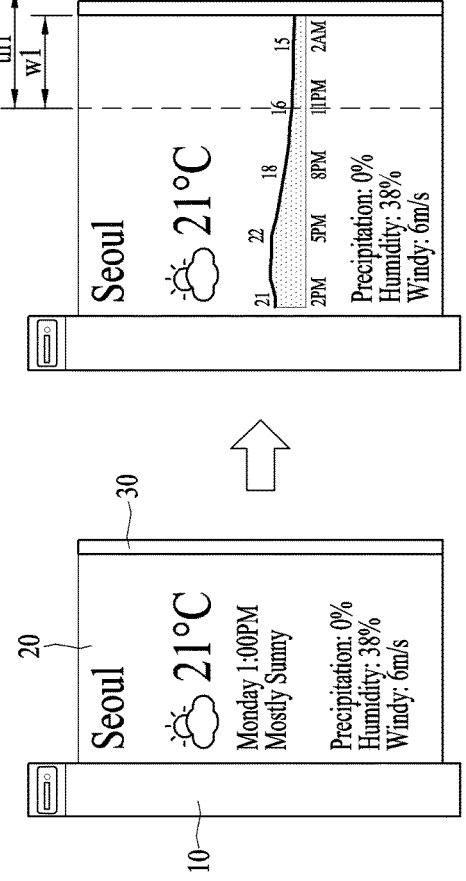
(c)
(d)

FIG. 9
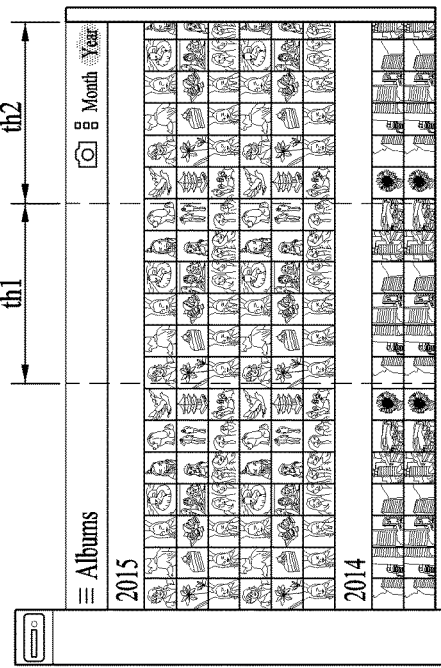
(a)
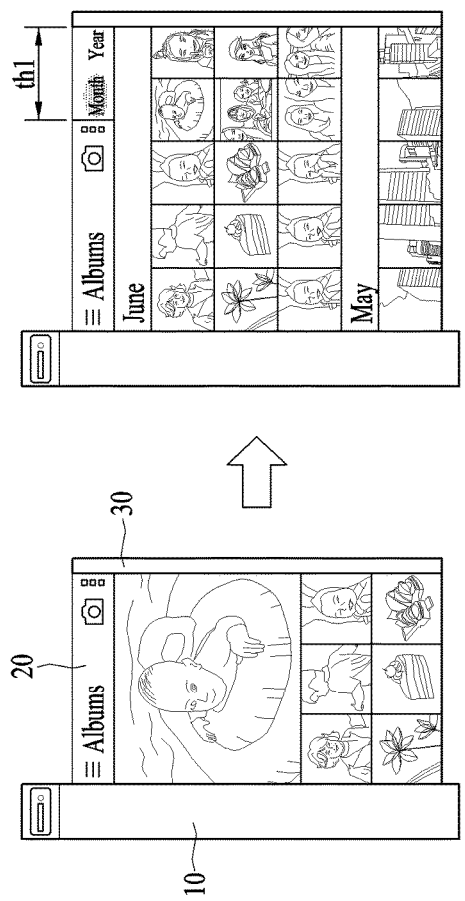
(b)
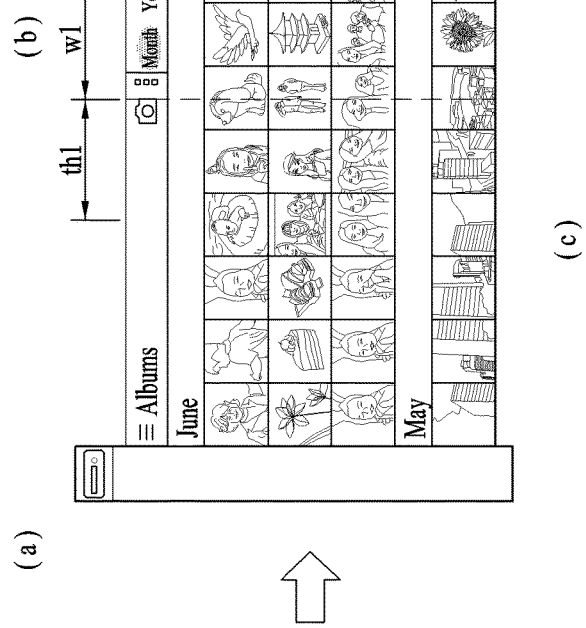
(c)
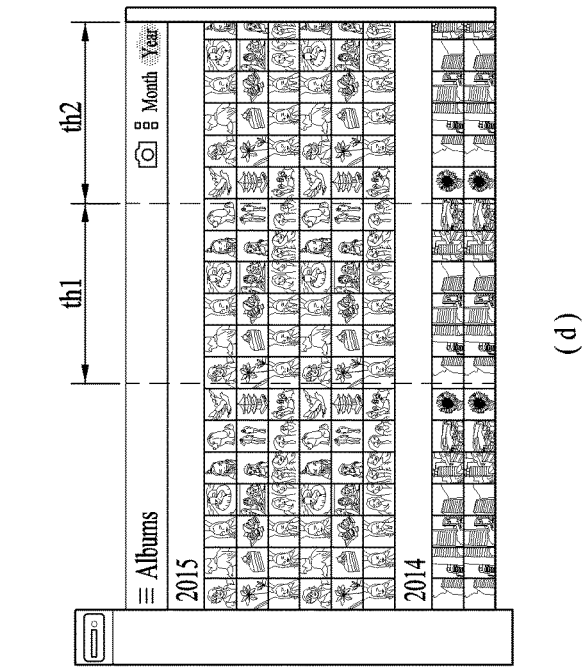
(d)

FIG. 10
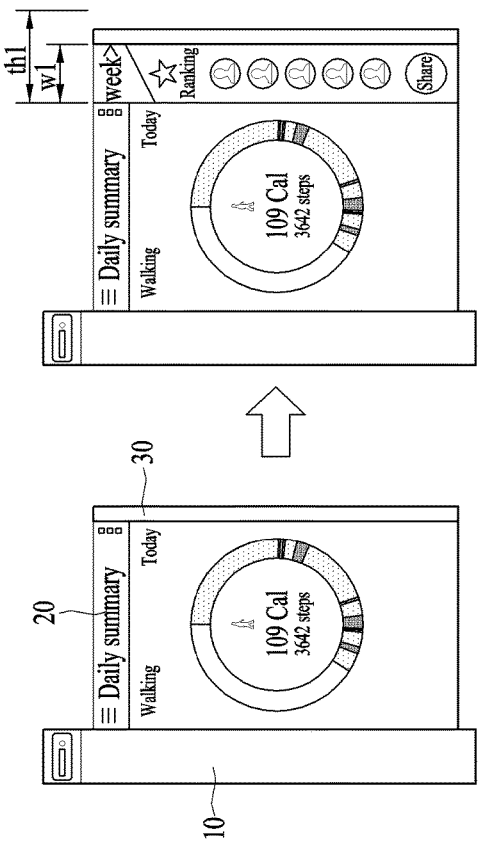
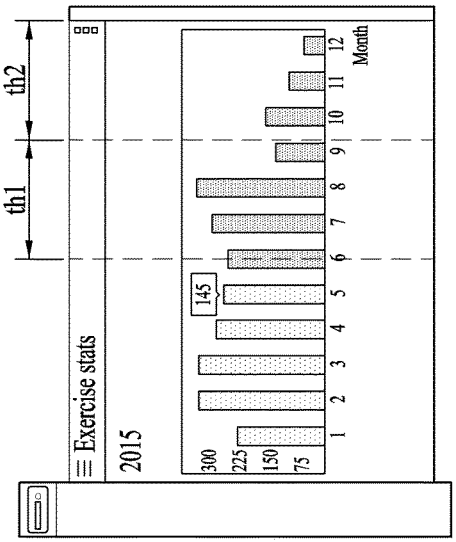
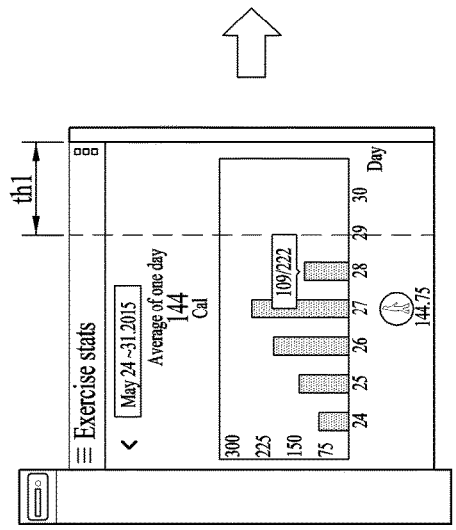
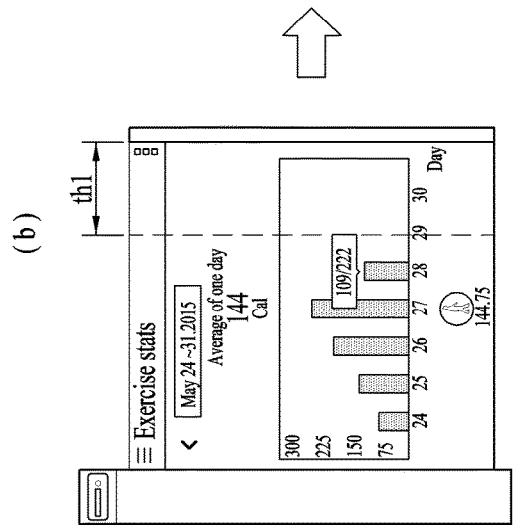

FIG. 27
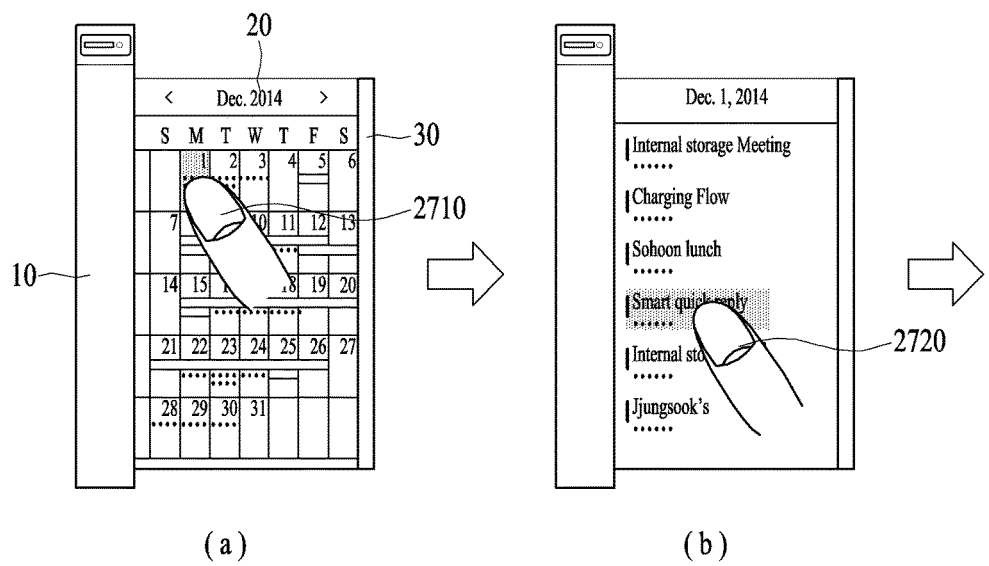
(a) (b)
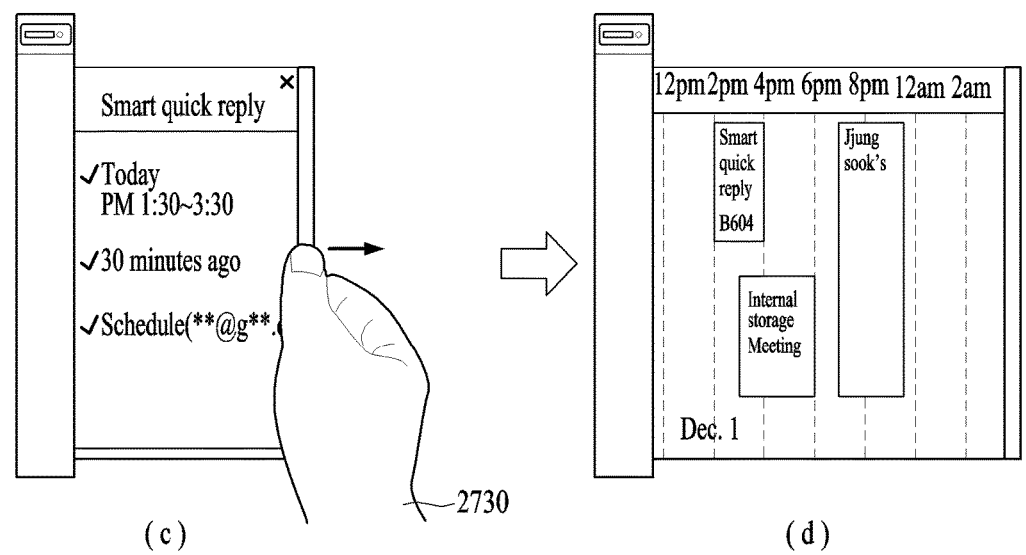
(c) (d)

MOBILE TERMINAL AND CONTROL METHOD THEREFOR

CROSS REFERENCE TO RELATED APPLICATIONS

This application is the National Phase of PCT International Application No. PCT/KR2016/000173, filed on Jan. 8, 2016, which claims priority under 35 U.S.C. 119(a) to Patent Application No. 10-2015-0137481, filed in Republic of Korea on Sep. 30, 2015, all of which are hereby expressly incorporated by reference into the present application.

TECHNICAL FIELD

The present invention relates to a mobile terminal and control method thereof, and more particularly, to a mobile terminal displaying various contents according to an extended width of a flexible display and control method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

As functions of the terminal are getting diversified, the terminal tends to be implemented as a multimedia player provided with complex functions such as photographing of photos or videos, playback of music or video files, game play, broadcast reception and the like for example Efforts are ongoing to support and increase the functionality of mobile terminals. Such efforts include software and hardware improvements, as well as changes and improvements in the structural components.

Meanwhile, in case of a mobile terminal provided with a flexible display, it is necessary to provide displayed contents variously when a size or width of a display unit is changed.

DISCLOSURE OF THE INVENTION

Technical Task

Accordingly, one technical task of the present invention is to obviate one or more problems including the aforementioned problems. Another technical task of the present invention is to display contents corresponding to different time concepts in response to an extension of a flexible display unit in a mobile terminal.

Further technical task of the present invention is to display various contents running on the same application in response to an input signal for a flexible display unit in a mobile terminal.

It should be understood that the above technical tasks of the present invention, are given by illustration only, since other technical tasks will become apparent to those skilled in the art from this detailed description.

Technical Solutions

In one technical aspect of the present invention, provided herein is a mobile terminal, including a flexible display unit, a sensing unit sensing an extension length of the flexible display unit and an input signal, and a controller configured to display a first content including a first time information on the flexible display unit, wherein if the flexible display unit is extended by a first preset length, the controller is further configured to display a second content including a second time information on the flexible display unit, wherein the first content and the second content comprise running screens provided in the course of running a same application, and wherein the first time information and the second time information are different from each other.

In another technical aspect of the present invention, provided herein is a method of controlling a mobile terminal including a flexible display unit, including displaying a first content including a first time information on the flexible display unit and if the flexible display unit is extended by a first preset length, displaying a second content including a second time information on the flexible display unit, wherein the first content and the second content comprise running screens provided in the course of running a same application and wherein the first time information and the second time information are different from each other.

Advantageous Effects

Effects and/or advantages of a mobile terminal and control method thereof according to the present invention are described as follows.

According to at least one of embodiments of the present invention, as a flexible display unit is extended, a content containing time information of a higher layer (hierarchy) can be provided in a mobile terminal and control method thereof.

According to at least one of embodiments of the present invention, various contents running on the same application can be provided by being changed in response to an input signal for a flexible display unit in a mobile terminal and control method thereof.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 2 is a perspective diagram of a mobile terminal according to one embodiment of the present invention.

FIG. 8 is a diagram showing an example of while a weather application is running, when a length of a display unit is extended, displaying a content in a mobile terminal according to one embodiment of the present invention.

FIG. 9 is a diagram showing an example of while a gallery application is running, when a length of a display unit is extended, displaying a content differently in a mobile terminal according to one embodiment of the present invention.

FIG. 10 is a diagram showing an example of while an exercise application is running, when a length of a display unit is extended, displaying a content differently in a mobile terminal according to one embodiment of the present invention.

FIG. 27 is a diagram showing an example of if a calendar application is launched, displaying a content in response to an input signal for a flexible display unit in a mobile terminal according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
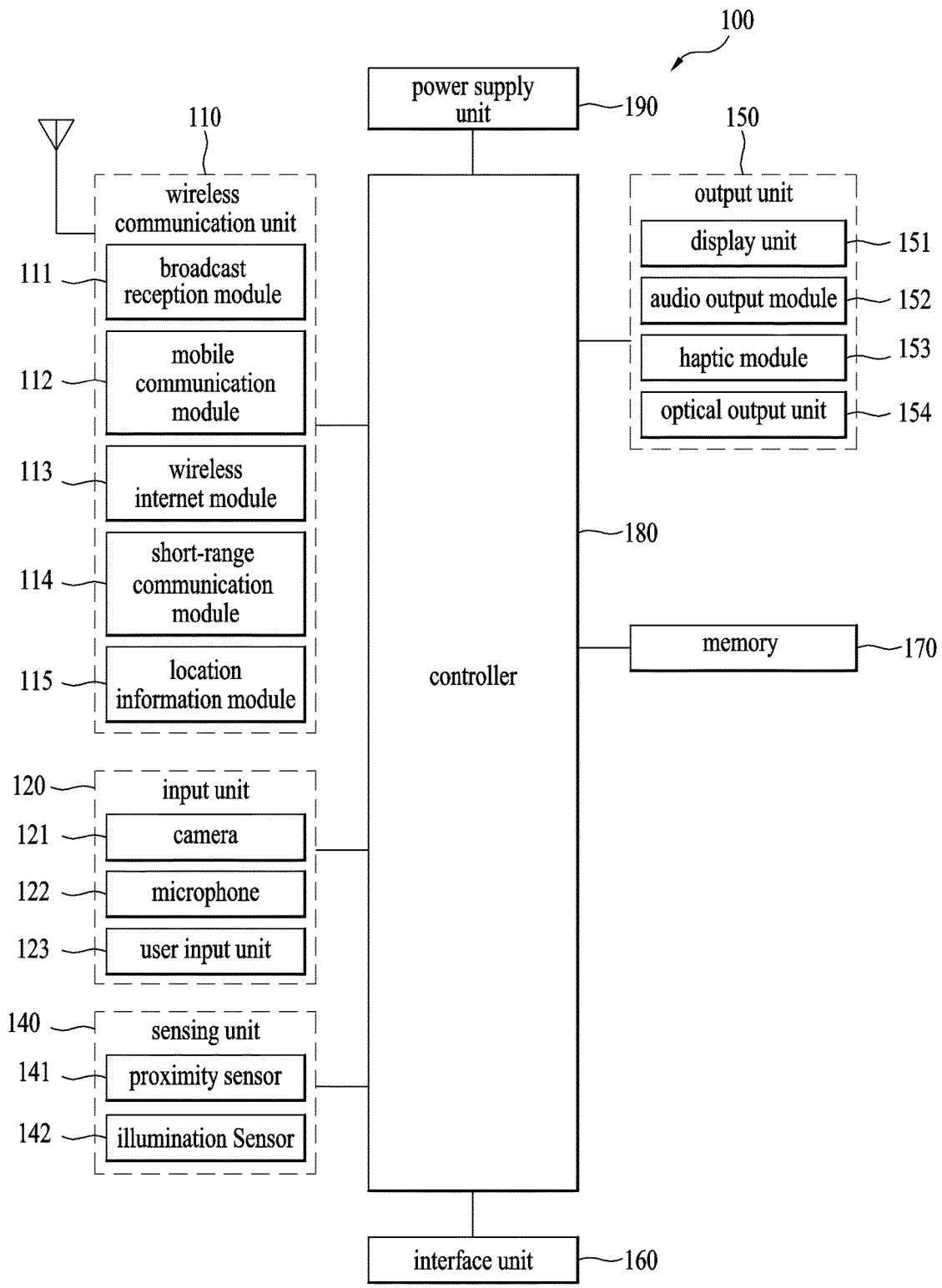
FIG. 1A is a block diagram of a mobile terminal in accordance with the present disclosure.
Figure 1B:
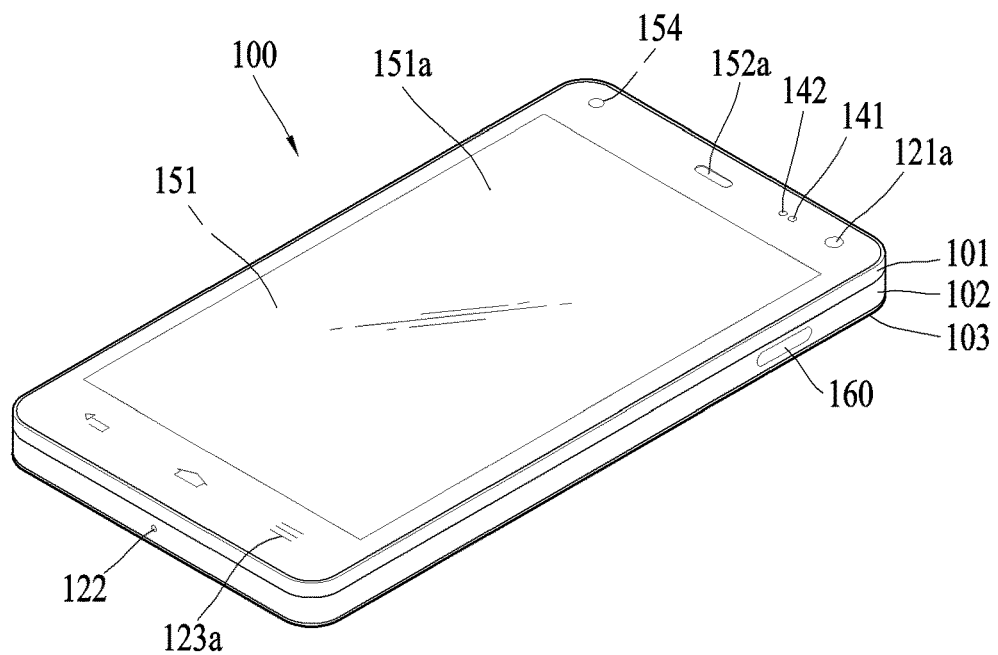
FIGS. 1B and 1C are conceptual views of one example of the mobile terminal, viewed from different directions.
Figure 1C:
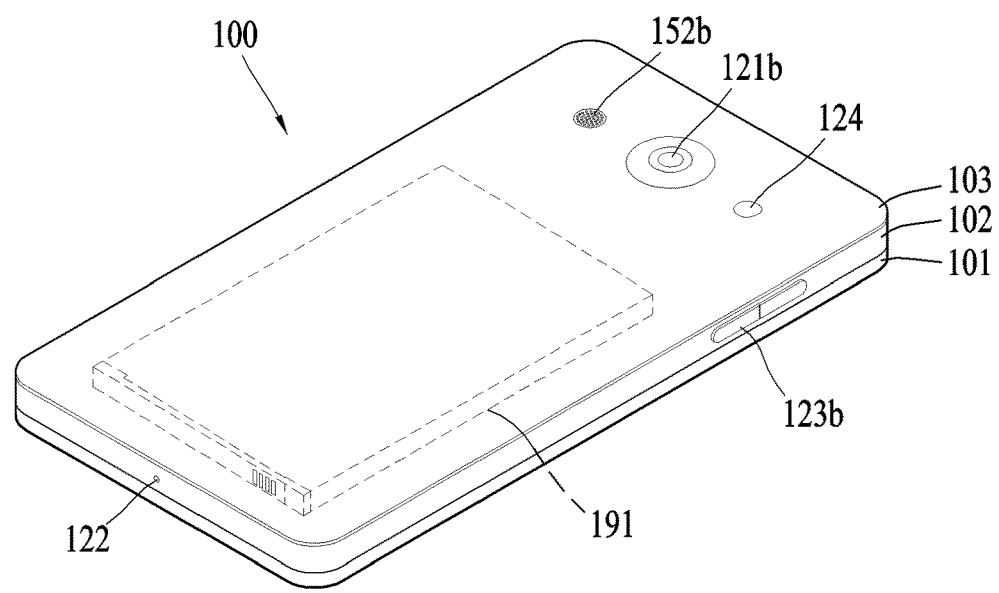

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may be equipped with the display 151, the 1st audio output unit 152*a*, the 2nd audio output unit 152*b*, the proximity sensor 141, the illumination sensor 142, the optical output unit 154, the 1st camera 121*a*, the 2nd camera 121*b*, the 1st manipulating unit 123*a*, the 2nd manipulating unit 123*b*, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

FIG. 2 is a perspective diagram of a mobile terminal according to one embodiment of the present invention.

In this figure, mobile terminal 200 is shown having display unit 20, which is a type of display that is deformable by an external force. This deformation, which includes display unit 20 and other components of mobile terminal 200, may include any of curving, bending, folding, twisting, rolling, and combinations thereof. The deformable display unit 20 may also be referred to as a "flexible display unit." In some implementations, the flexible display unit 20 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 20 is not deformed (for example, in a state with an infinite radius of curvature and referred to as a first state), a display region of the flexible display unit 20 includes a generally flat surface. When in a state that the flexible display unit 20 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 20 may be a curved state (for example, a state of being curved from up to down or from right to left), instead of being in flat state. In this embodiment, when an external force is applied to the flexible display unit 20, the flexible display unit 20 may transition to the second state such that the flexible display unit is deformed into the flat state (or a less curved state) or into a more curved state.

If desired, the flexible display unit 20 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 20. The deformation sensor may be included in the sensing unit 140.

The deformation sensor may be located in the flexible display unit 20 or the case 201 to sense information related to the deforming of the flexible display unit 20. Examples of such information related to the deforming of the flexible display unit 20 may be a deformed direction, a deformed degree, a deformed position, a deformed amount of time, an acceleration that the deformed flexible display unit 20 is restored, and the like. Other possibilities include most any type of information which can be sensed in response to the curving of the flexible display unit or sensed while the flexible display unit 20 is transitioning into, or existing in, the first and second states.

In some embodiments, the controller 180 or other component can change information displayed on the flexible display unit 20, or generate a control signal for controlling a function of the mobile terminal 200, based on the information related to the deforming of the flexible display unit 20. Such information is typically sensed by the deformation sensor.

The mobile terminal 200 is shown having a case 10 for accommodating the flexible display unit 20. The case 10 can be deformable together with the flexible display unit 20, taking into account the characteristics of the flexible display unit 20.

A battery (not shown in this figure) located in the mobile terminal 200 may also be deformable in cooperation with the flexible display unit 20, taking into account the characteristic of the flexible display unit 20. One technique to implement such a battery is to use a stack and folding method of stacking battery cells.

The deformation of the flexible display unit 20 not limited to perform by an external force. For example, the flexible display unit 20 can be deformed into the second state from the first state by a user command, application command, or the like.

A mobile terminal according to one embodiment of the present invention may correspond to a mobile terminal 200 of which size of a flexible display unit 20 can be adjusted by a user. The mobile terminal 200 according to one embodiment of the present invention may include a body unit 10 having various electronic components built therein and a flexible display unit 20. The mobile terminal according to one embodiment of the present invention may further include a holder 30 sensing an input for extending the flexible display unit 20. A user can adjust a size of a display region in a manner of moving the display unit 20 right and left by gripping the holder 30 in the mobile terminal. Hence, an externally exposed region of the flexible display unit 20 can be extended or reduced by rolling.

Figure 3:
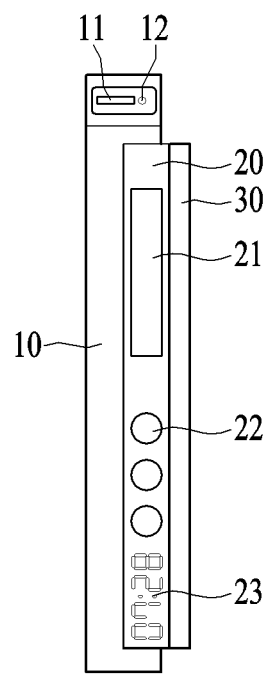
FIG. 3 is a diagram showing an extended state of a portion of a flexible display unit of a mobile terminal according to one embodiment of the present invention.

FIG. 3 is a diagram showing an extended state of a portion of a flexible display unit of a mobile terminal according to one embodiment of the present invention.

Referring to FIG. 3, a minimum region of a display unit 20 of a mobile terminal can be externally exposed. In this case, the mobile terminal can minimize the exposed region of the display unit 20 by displaying regions such as a message window 21, an icon 22m a time display unit 23 and the like on the display unit 20 only.

Meanwhile, a prescribed part of a body unit 10 of the mobile terminal may be provided with an audio output unit 11 and a camera 12. For example, in the present invention, the audio output unit 11 and the camera 12 may be configured to face the same direction all the time.

Figure 4:
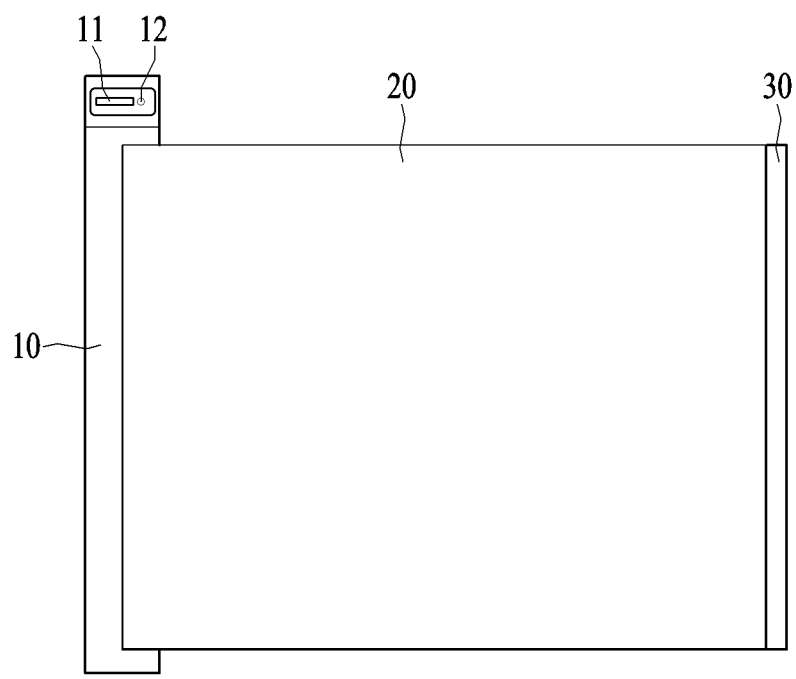
FIG. 4 is a diagram showing an extended state of a whole flexible display unit of a mobile terminal according to one embodiment of the present invention.

FIG. 4 is a diagram showing an extended state of a whole flexible display unit of a mobile terminal according to one embodiment of the present invention.

Referring to FIG. 4, it may correspond to a case that a mobile terminal exposes a maximum region of a display unit 20 externally. A flexible display unit 20 of the mobile terminal can be extended or reduced by rolling a display unit. For example, the mobile terminal can be implemented once when the flexible display unit 20 is extended or reduced. Moreover, for example, the flexible display unit 20 of the mobile terminal may be implemented to be gradually extended or reduced step by step when it is extended or reduced. Moreover, the mobile terminal maximizes an exposed region of the flexible display unit 20, thereby displaying a screen on a wider region. In the present invention, when the flexible display unit 20 of the mobile terminal is extended or reduced, it can be implemented through the preset two steps, by which the present invention is non-limited. The present invention may implement the extension or reduction through 1 step or 3 steps or more.

In the following, embodiments related to a control method implemented in the above-configured mobile terminal are described with reference to the accompanying drawings. And, it will be apparent to those skilled in the art that various modifications and variations can be made therein without departing from the spirit and scope of the invention.

FIGS. 5 to 30 are provided to describe a change of a displayed content according to an extension length of a flexible display unit in a mobile terminal having an extendable flexible display unit (hereinafter called 'display unit'). Moreover, a length of the flexible display unit mentioned in the present invention is assumed as corresponding to a width of the flexible display unit.

With respect to the embodiments of FIGS. 5 to 30 in the following, operations performed in the mobile terminal can be controlled by the controller 180 of FIG. 1A. For clarity, such operations shall be collectively illustrated and described as performed/controlled by the mobile terminal.

Moreover, a display unit of a mobile terminal shall be described in the present invention on the assumption that a length of a flexible display unit is increased from a minimum length for displaying a content. Here, the minimum length for displaying a content on the display unit is assumed as a unit length. For example, if the display unit is extended by a unit length, the mobile terminal can display a running screen of an application. A first content, a second content and the like described or mentioned in the present invention is assumed as corresponding to a running screen of an application. Yet, in the present invention, although the display unit is not extended by the unit length, the mobile terminal may display a running screen of an application.

Meanwhile, a display unit of a mobile terminal according to one embodiment of the present invention can sense various input signals for extending a length. For example, an input signal may correspond to an input for manually moving a holder 30 provided to one side of the display unit. For example, an input signal may correspond to an input for a soft or hardware key for automatically moving the display unit.

Moreover, a display unit of a mobile terminal according to one embodiment of the present invention can display a content containing different time information as a length is extended. For example, a content containing time information may include a weather application, a calendar application, an exercise application, a gallery application, a payment application and the like, by which such a content is non-limited.

Figure 5:
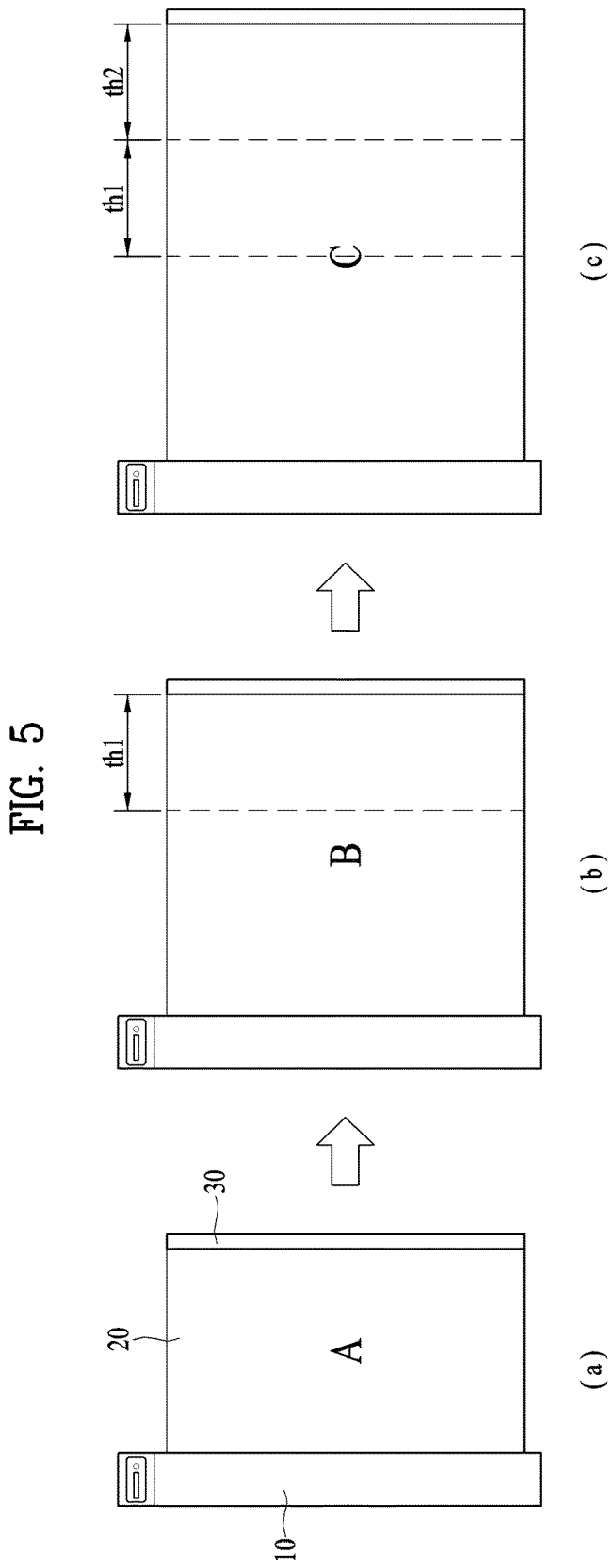
FIG. 5 is a diagram showing an example of when a length of a flexible display unit is extended, displaying a content in a mobile terminal according to one embodiment of the present invention.

FIG. 5 is a diagram showing an example of when a length of a flexible display unit is extended, displaying a content in a mobile terminal according to one embodiment of the present invention.

First of all, referring to FIG. 5 (a), in a state that a display unit 20 is extended by a unit length, a mobile terminal can display a content A. Here, the content A may correspond to a content containing first time information.

Referring to FIG. 5 (b), in a state that the display unit 20 is extended by a first preset length th1 with reference to a unit length, the mobile terminal can display a content B. Here, the content B may correspond to a content containing second time information. In this case, if sensing a first input signal, the mobile terminal can control the display unit 20 to be extended by the first preset length th1 [Not shown in FIG. 5].

Referring to FIG. 5 (c), in a state that the display unit 20 is extended by a second preset length th2 in addition to the unit length and the first preset length th1, the mobile terminal can display a content C. Here, the content C may correspond to a content containing third time information. In this case, if sensing a second input signal, the mobile terminal can control the display unit 20 to be extended by the second preset length th2 [Not shown in FIG. 5].

Meanwhile, the aforementioned contents A to C may correspond to a screen running on the same application. Yet, the contents A to C may contain different time informations. For example, the second time information of the content B may correspond to time information of the concept higher than that of the first time information of the content A. For example, the third time information of the content C may correspond to time information of the concept higher than that of the second time information of the content B.

Namely, through the above embodiment, a user extends a display unit while a same application is running, thereby using a running screen of an application corresponding to time information of a higher concept.

Figure 6:
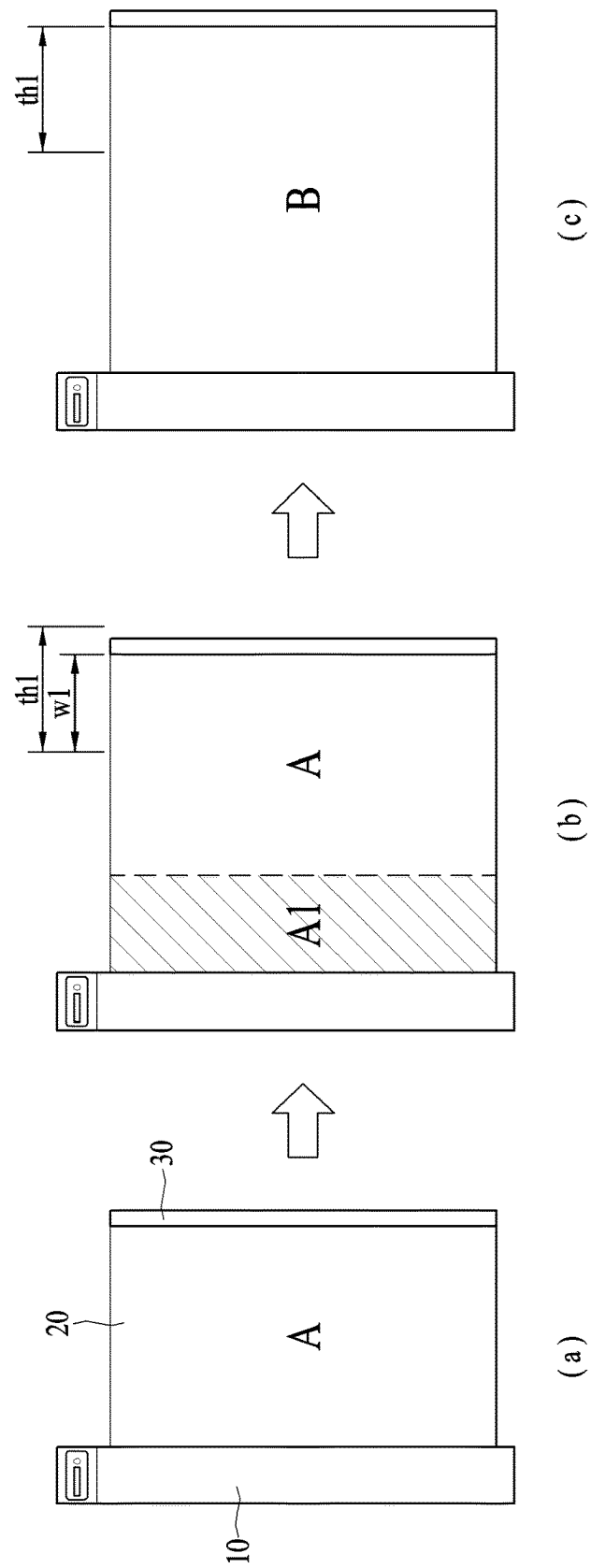
FIG. 6 is a diagram showing an example of when a length of a flexible display unit is extended, displaying a content in a mobile terminal according to one embodiment of the present invention.
Figure 7:
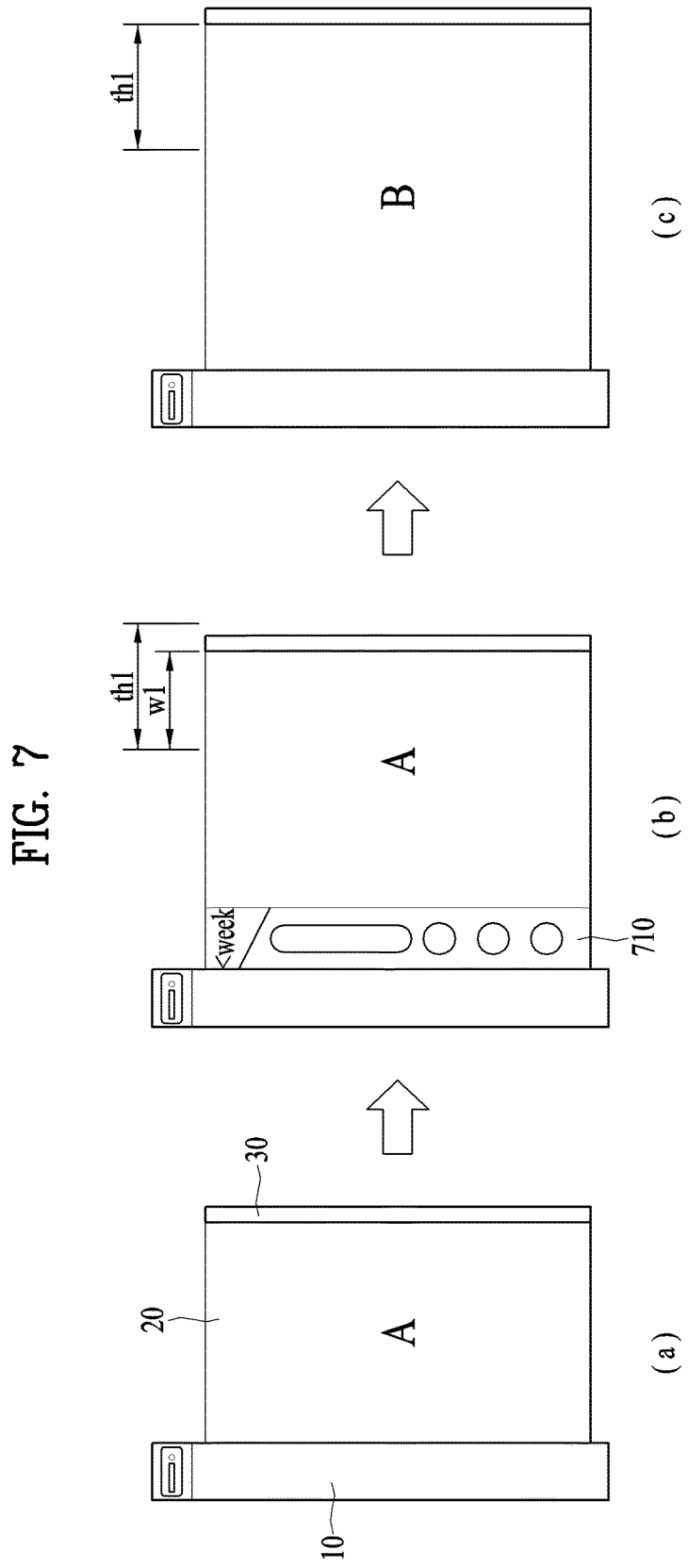
FIG. 7 is a diagram showing an example of when a length of a flexible display unit is extended, displaying a content in a mobile terminal according to one embodiment of the present invention.

FIG. 6 and FIG. 7 show one example of a content displayed if the display unit 20 of the mobile terminal is not extended by the first preset length th1 or the second preset length th2 unlike FIG. 5.

FIG. 6 is a diagram showing an example of when a length of a flexible display unit is extended, displaying a content in a mobile terminal according to one embodiment of the present invention.

First of all, referring to FIG. 6 (a), in a state that a display unit 20 is extended by a unit length, a mobile terminal can display a content A. Moreover, referring to FIG. 6 (b), the display unit 20 of the mobile terminal can be extended by a first length w1 from a unit length. Here, the first length w1 may correspond to the length shorter than the first preset length th1 mentioned in FIG. 5.

In this case, the mobile terminal can display a content A1 on the extended portion of the display unit 20. Particularly, as shown in FIG. 6 (b), if the display unit 20 is extended to the right by a length w1, the mobile terminal can display a content A1 on an extended portion of the display unit 20 on the left side. Here, the content A1 and the content A may correspond to a content containing the same time information. For example, the content A1 may correspond to additional information of the content A. For example, the content A1 may correspond to a portion of an extended screen of the content A.

Referring to FIG. 6 (c), in a state that the display unit 20 of the mobile terminal is extended by the first preset length th1 with reference to a unit length, it is able to display a content B. As described in FIG. 5, the content B corresponds to a screen running on the same application of the content A and may correspond to a content containing time information of the concept higher than that of the content A.

Meanwhile, if the display unit is extended by a second length (not shown) in the state that the display unit is extended by the unit length and the first preset length th1, the mobile terminal can display a content B1 on a region corresponding to the second length [not shown in FIG. 6]. Here, the second length may correspond to a length shorter than the second preset length mentioned in FIG. 5. Moreover, the content B1 may correspond to additional information related to the content B.

FIG. 7 is a diagram showing an example of when a length of a flexible display unit is extended, displaying a content in a mobile terminal according to one embodiment of the present invention. The substance of the embodiment of FIG. 7 redundant with the description of FIG. 6 shall be omitted.

In a state that a display unit 20 shown in FIG. 7 (a) is extended by a unit length, as shown in FIG. 7 (b), a display unit 20 can be extended by a first length w1. In this case, a mobile terminal can display a controller 710 on a region extended by the first length. Here, the controller 710 may include at least one menu option for controlling the mobile terminal or a content displayed on the display unit 20. The controller 710 may be displayed on one side of the display unit 20. For example, the controller 710 may be displayed on the left side of the display unit 20 in FIG. 7 (*a*).

Referring to FIG. 7 (*c*), in a state that the display unit 20 of the mobile terminal is extended by a first preset length th1 with reference to a unit length, it is able to display a content B. In this case, the mobile terminal may delete the controller 710 displayed on the left side of the display unit 20 and display the content B on a full region of the display unit 20.

Meanwhile, if the display unit is extended by a second length (not shown) in a state that the display unit is extended by the unit length and the first preset length th1, the mobile terminal can display a controller (not shown) on a region corresponding to the second length [Not shown in FIG. 7].

FIGS. 8 to 10 show examples of applying the embodiments of FIGS. 5 to 7 to an application actually. Particularly, FIGS. 8 to 10 show examples on a weather application, a gallery application and an exercise application, respectively.

FIG. 8 is a diagram showing an example of while a weather application is running, when a length of a display unit is extended, displaying a content in a mobile terminal according to one embodiment of the present invention.

Referring to FIG. 8 (*a*), in a state that a display unit 20 is extended by a unit length, a mobile terminal can display weather of '1 day'. Particularly, in the state that the display unit 20 is extended by the unit length, if a weather application is launched, the mobile terminal can display the weather of '1 day' on the display unit 20. Regarding this, the mobile terminal can sense an input signal for launching the weather application and an input signal for extending the display unit [Not shown in FIG. 8].

Referring to FIG. 8 (*b*), the mobile terminal can sense a state that the display unit 20 is extended by a first length w1 from the unit length. With respect to this, the mobile terminal can sense a first input signal (not shown) for extending the display unit 20 by the first length w1. Here, the first length w1 may correspond to a length shorter than the aforementioned first preset length th1. In this case, the mobile terminal can display the weather of '1 day' on the display unit 20. Yet, in case of the embodiment of FIG. 8 (*b*), the weather of '1 day' can be further provided in detail unlike the embodiment of FIG. 8 (*a*). For example, compared with the weather of '1 day' shown in FIG. 8 (*a*), the weather of '1 day' shown in FIG. 8 (*b*) can provide temperature change per time slot in addition.

Referring to FIG. 8 (*c*), the mobile terminal can sense a state that the display unit 20 is extended by a first preset length th1 from the unit length. With respect to this, the mobile terminal can sense a second input signal (now shown) for extending the display unit 20 by the first preset length th1. In this case, the mobile terminal can display the weather of '1 week' on the display unit 20.

Referring to FIG. 8 (*d*), the mobile terminal can sense a state that the display unit 20 is extended by the first preset length th1 and a second preset length th2 from the unit length. With respect to this, the mobile terminal can sense a third input signal (now shown) for extending the display unit 20 by the second preset length th2. In this case, the mobile terminal can display the weather of '1 month' on the display unit 20.

Meanwhile, according to the above embodiment, as the display unit 20 is extended, while the weather application is running, the weather of '1 day', '1 week' or '1 month' is displayed. Yet, the order for displaying the weather content and time information of the weather content are non-limited by the above description.

FIG. 9 is a diagram showing an example of while a gallery application is running, when a length of a display unit is extended, displaying a content differently in a mobile terminal according to one embodiment of the present invention.

Referring to FIG. 9 (*a*), in a state that a display unit 20 is extended by a unit length, a mobile terminal can display at least one thumbnail image corresponding to images photographed for '1 day'. Particularly, in the state that the display unit 20 is extended by the unit length, if a gallery application is launched, the mobile terminal can display the at least one thumbnail image corresponding to the images photographed for '1 day' on the display unit 20.

For example, the gallery application may correspond to an application displaying a captured image or video. Regarding this, the mobile terminal can sense an input signal for launching the gallery application and an input signal for extending the display unit [Not shown in FIG. 9].

Moreover, in the state that the display unit 20 is extended by the unit length, if a gallery application is launched, the mobile terminal can display at least one thumbnail image corresponding to images photographed for '1 week' [Not shown in FIG. 9].

Referring to FIG. 9 (*b*), the mobile terminal can sense a state that the display unit 20 is extended by a first length w1 from the unit length. In this case, the mobile terminal can display at least one thumbnail image corresponding to images photographed for '1 month' on the display unit 20. Here, a size of each of the at least one thumbnail image corresponding to the images photographed for '1 month' may be smaller than that of a thumbnail image shown in FIG. 9 (*a*).

Referring to FIG. 9 (*c*), the mobile terminal can sense a state that the display unit 20 is extended by a first preset length th1 and a first length w1 from the unit length. Here, the first length w1 may be shorter than a second preset length th2. In this case, the mobile terminal can additionally display at least one thumbnail image corresponding to images photographed for '1 month'. Namely, in the embodiment of FIG. 9 (*c*), the number of the thumbnail images displayed in width may be greater than that of the thumbnail images shown in the embodiment of FIG. 9 (*b*).

Meanwhile, if the display unit is longer than the unit length and the first preset length th1 but shorter than the unit length, the first preset length th1 and the second preset length th2, the mobile terminal may display at least one thumbnail image corresponding to images photographed for '1 week' [Not shown in FIGS. 9 (*b*) and (*c*)].

Referring to FIG. 9 (*d*), the mobile terminal can sense a state that the display unit 20 is extended by the first preset length th1 and the second preset length th2 from the unit length. In this case, the mobile terminal can display at least one thumbnail image corresponding to images photographed for '1 year' on the display unit 20. Here, a size of each of the at least one thumbnail image corresponding to the images photographed for '1 year' may be smaller than that of a thumbnail image shown in each of FIG. 9 (*b*) and FIG. 9 (*c*).

Meanwhile, according to the above embodiment, as the display unit 20 is extended, while the gallery application is running, the images photographed for '1 day', '1 month' and '1 year' are displayed in order. Yet, the order for displaying the images and time information of the gallery content are non-limited by the above description.

FIG. 10 is a diagram showing an example of while an exercise application is running, when a length of a display unit is extended, displaying a content differently in a mobile terminal according to one embodiment of the present invention.

Referring to FIG. 10 (*a*), in a state that a display unit 20 is extended by a unit length, a mobile terminal can display an exercise amount of '1 day'. Particularly, in the state that the display unit 20 is extended by the unit length, if an exercise application is launched, the mobile terminal can display the exercise amount of '1 day' on the display unit 20. Regarding this, the mobile terminal can sense an input signal for launching the exercise application and an input signal for extending the display unit [Not shown in FIG. 10].

Referring to FIG. 10 (*b*), the mobile terminal can sense a state that the display unit 20 is extended by a first length w1 from the unit length. In this case, the mobile terminal can display a controller 1010 on a region extended by the first length w1. For example, the controller 1010 can display various menu options available for a user on the exercise application. Moreover, for example, the controller 1010 can display an option indicating the ranking of an exercise amount of '1 day'.

Referring to FIG. 10 (*c*), the mobile terminal can sense a state that the display unit 20 is extended by a first preset length th1 from the unit length. In this case, the mobile terminal can display a exercise amount of '1 week' on the display unit 20.

Referring to FIG. 10 (*d*), the mobile terminal can sense a state that the display unit 20 is extended by the first preset length th1 and a second preset length th2 from the unit length. In this case, the mobile terminal can display an exercise amount of '1 month' on the display unit 20.

Meanwhile, according to the above embodiment, as the display unit 20 is extended, while the exercise application is running, the exercise amount of '1 day', '1 week' or '1 month' is displayed. Yet, the order for displaying the exercise content and time information of the exercise content are non-limited by the above description.

Meanwhile, the embodiments of FIGS. 8 to 10 are identically applicable to a payment application. A mobile terminal can display a payment history for '1 day' in a state that a display unit is extended by a unit length [Not shown in FIGS. 8 to 10]. If the display unit is extended by a unit length and a first preset length, the mobile terminal can display a payment history for '1 week'. If the display unit is extended by a unit length, a first preset length and a second preset length, the mobile terminal can display a payment history for '1 month'. The above embodiments are non-limited by the above description. And, time information related to a displayed payment history can be implemented in various ways.

Figure 11:
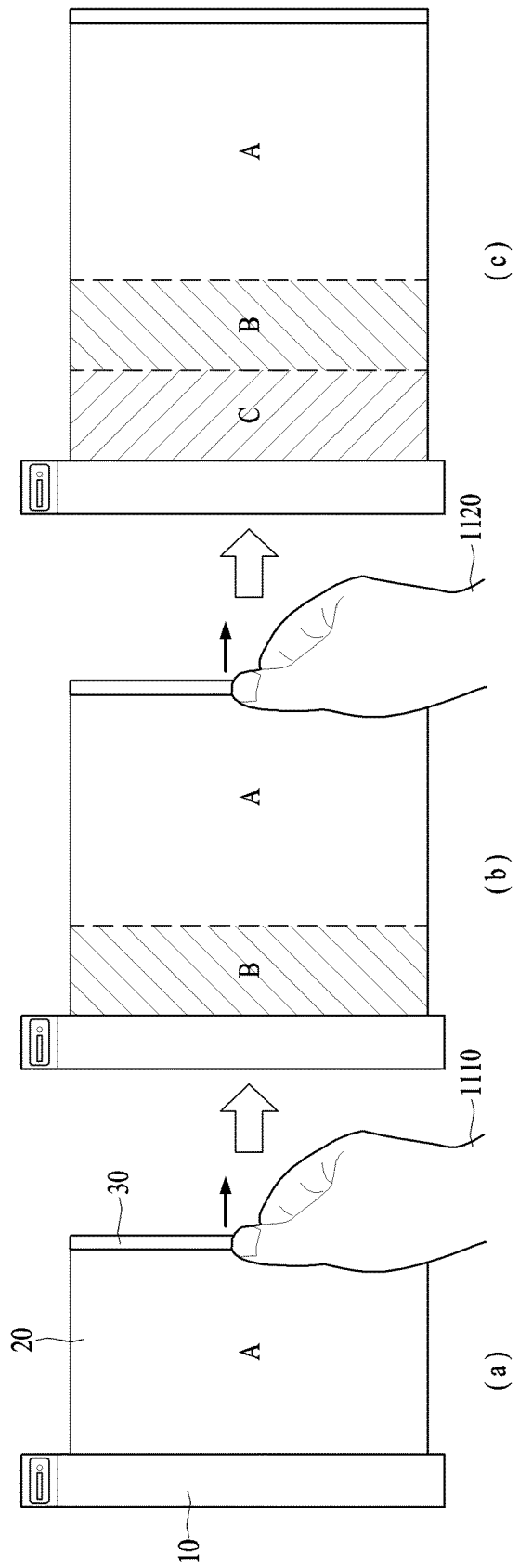
FIG. 11 is a diagram showing an example of a content displayed region when a flexible display unit is extended in one direction in a mobile terminal according to one embodiment of the present invention.
Figure 12:
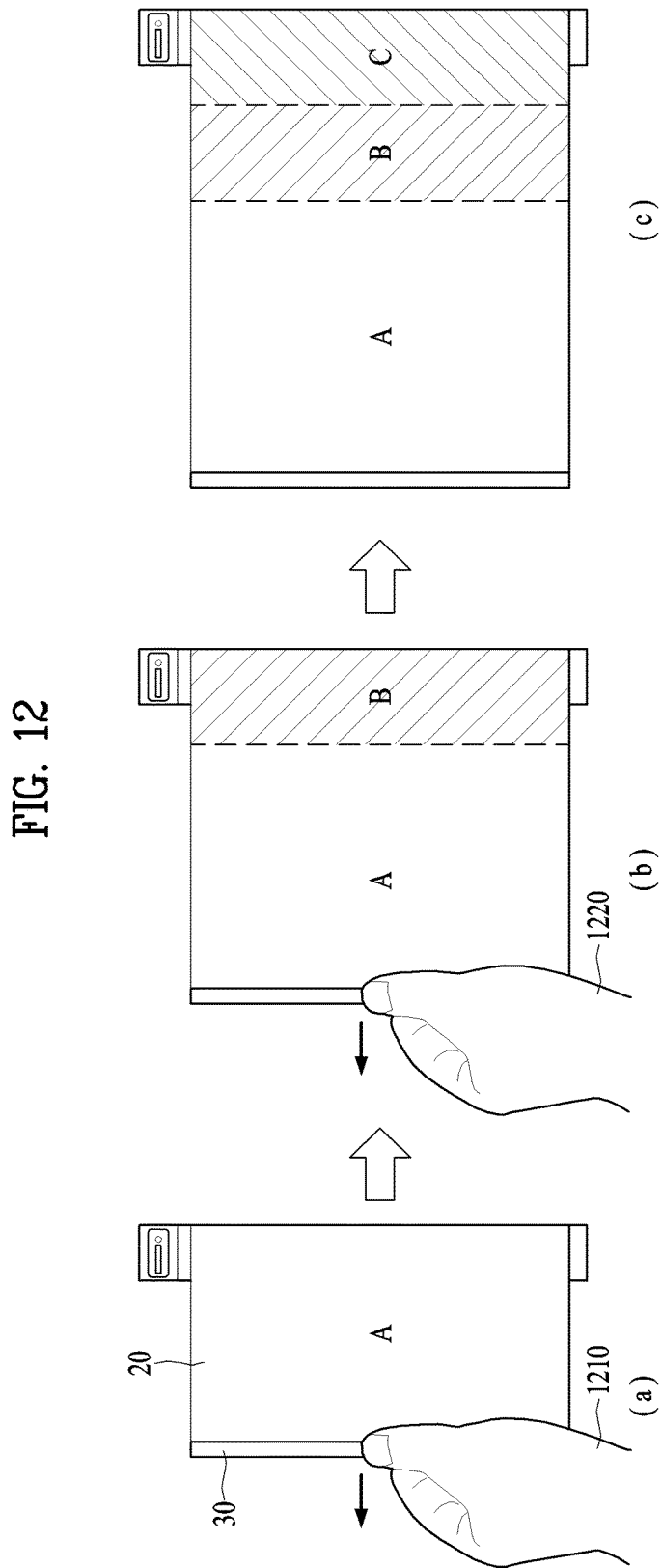
FIG. 12 is a diagram showing an example of a content displayed region when a flexible display unit is extended in one direction in a mobile terminal according to one embodiment of the present invention.

FIG. 11 and FIG. 12 show a location of a region extended on a display unit along an extension direction of the display unit.

FIG. 11 is a diagram showing an example of a content displayed region when a flexible display unit is extended in one direction in a mobile terminal according to one embodiment of the present invention.

Referring to FIG. 11 (*a*), in a state that a display unit 20 is extended by a unit length, a mobile terminal can sense a first input signal 1110. In the embodiment of FIG. 11, the unit-length extended state of the display unit 20 shall be referred to as a region A. Here, the first input signal 1110 may correspond to an input for moving a holder 30 to the right.

In this case, as shown in FIG. 11 (*b*), the mobile terminal can provide a region B to a left side of the region A on the display unit 20. The mobile terminal can sense a second input signal 1120. Here, the second input signal 1120 may correspond to an input for moving the holder 30 to the right. In this case, as shown in FIG. 11 (*c*), the mobile terminal can provide a region C to a left side of the region A and the region B on the display unit 20.

FIG. 12 is a diagram showing an example of a content displayed region when a flexible display unit is extended in one direction in a mobile terminal according to one embodiment of the present invention.

Referring to FIG. 12 (*a*), in a state that a display unit 20 is extended by a unit length, a mobile terminal can sense a first input signal 1210. In the embodiment of FIG. 12, the unit-length extended state of the display unit 20 shall be referred to as a region A. Here, the first input signal 1210 is an input signal in a direction opposite to that of the former first input signal of FIG. 11, and may correspond to an input for moving a holder 30 to the left.

In this case, as shown in FIG. 12 (*b*), the mobile terminal can provide a region B to a right side of the region A on the display unit 20. The mobile terminal can sense a second input signal 1220. Here, the second input signal 1220 may correspond to an input for moving the holder 30 to the left.

In this case, as shown in FIG. 12 (*c*), the mobile terminal can provide a region C to a right side of the region A and the region B on the display unit 20.

Through the embodiments of FIG. 11 and FIG. 12, the mobile terminal can provide a new display region in a direction opposite to an extension direction of the display unit.

The following case is described with reference to FIGS. 13 to 17. First of all, in a state that a display unit is extended by a predetermined length, after the display unit has been moved in one direction, if an input for returning the display unit to a previous location is sensed, a content is displayed on the display unit.

Figure 13:
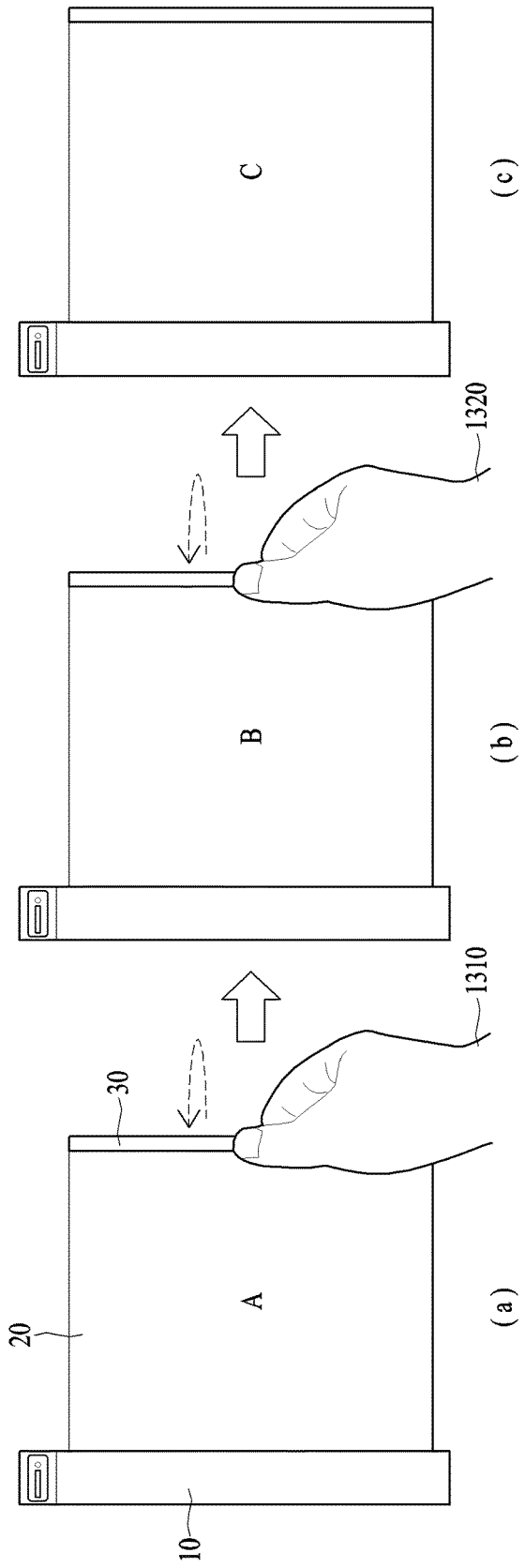
FIG. 13 is a diagram showing an example of displaying a content differently in response to an input signal for a flexible display unit in a mobile terminal according to one embodiment of the present invention.

FIG. 13 is a diagram showing an example of displaying a content differently in response to an input signal for a flexible display unit in a mobile terminal according to one embodiment of the present invention.

Referring to FIG. 13 (*a*), a mobile terminal can display a first information on a display unit 20. Particularly, in a state that the display unit 20 is extended by a predetermined length, the mobile terminal can display a content A. The predetermined-length extended state of the display unit in FIG. 13 may include the state that the display unit is extended by the unit length, the state that the display unit is extended by the unit length and the first preset length, and the state that the display unit is extended by the unit length, the first preset length and the second preset length, in the former embodiments.

In doing so, the mobile terminal can sense a first input signal 1310. Here, the first input signal 1310 may correspond to an input of moving the display unit 20 in a direction getting away from a body unit 10 and then moving back in an opposite direction while a portion of the display unit 20 or a holder 30 is touched.

If so, referring to FIG. 13 (*b*), the mobile terminal can display a content B on the display unit 20. Here, a size of the display unit having the content B displayed thereon may be equal to that of the display unit having the content A displayed thereon in FIG. 13 (*a*). The content B corresponds to a screen running on the same application of the content A. The content B and the content A include the information of the same concept and do not correspond to informations of higher and lower concepts. The content B may correspond to information containing the same time information of the content A.

The mobile terminal may sense a second input signal 1320. Here, the second input signal 1320 may correspond to an input of moving the display unit 20 in a direction getting away from the body unit 10 and then moving back in an opposite direction while a portion of the display unit 20 or the holder 30 is touched.

If so, referring to FIG. 13 (*c*), the mobile terminal can display a content C on the display unit 20. Here, a size of the display unit having the content C displayed thereon may be equal to that of the display unit having the content A or B displayed thereon. The content C corresponds to a screen running on the same application of the content A or B. The content C and the content A or B include the information of the same concept and do not correspond to informations of higher and lower concepts.

Namely, through the embodiment of FIG. 13, in a state that the display unit is extended by a predetermined size, each time an input signal is sensed, the mobile terminal can display the changed information of the same hierarchy on the same application.

Figure 14:
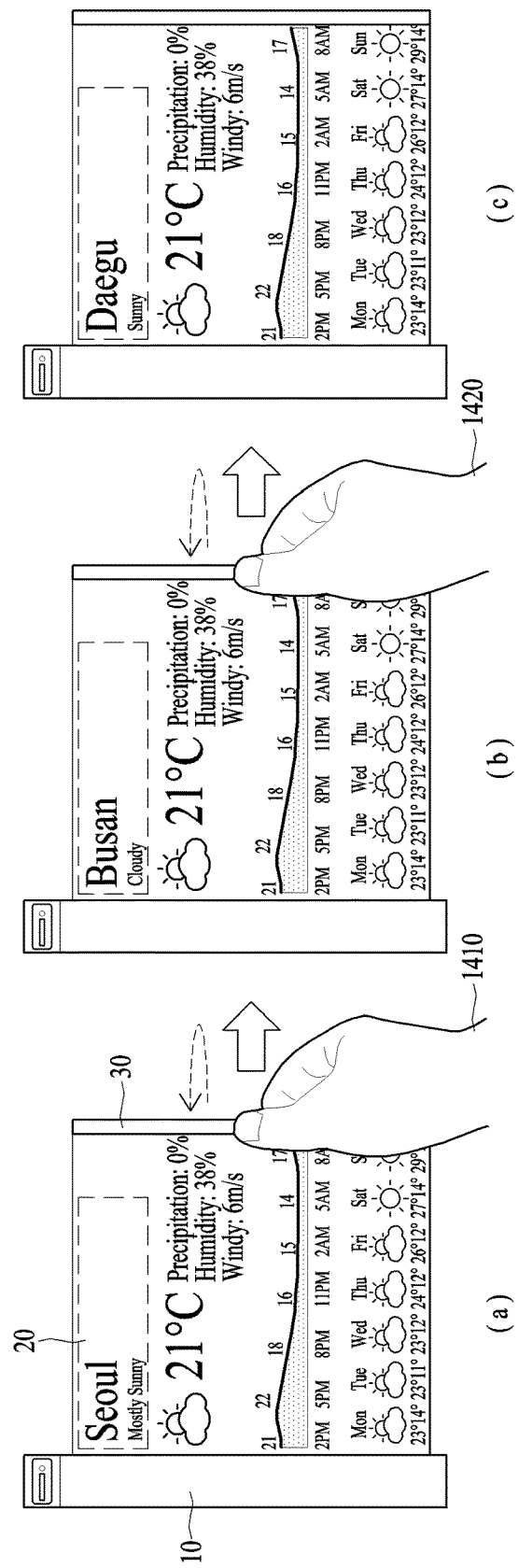
FIG. 14 is a diagram showing an example of while a weather application is running, displaying a weather content differently in response to an input signal for a flexible display in a mobile terminal according to one embodiment of the present invention.
Figure 15:
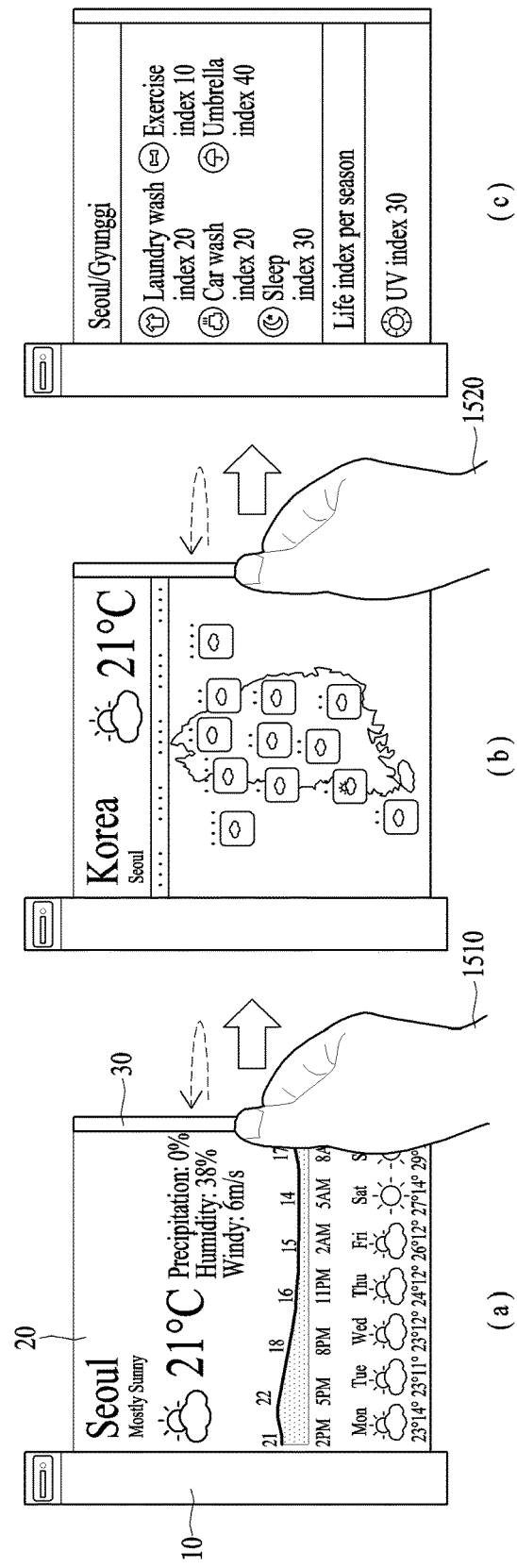
FIG. 15 is a diagram showing an example of while a weather application is running, displaying a weather content differently in response to an input signal for a flexible display in a mobile terminal according to one embodiment of the present invention.
Figure 16:
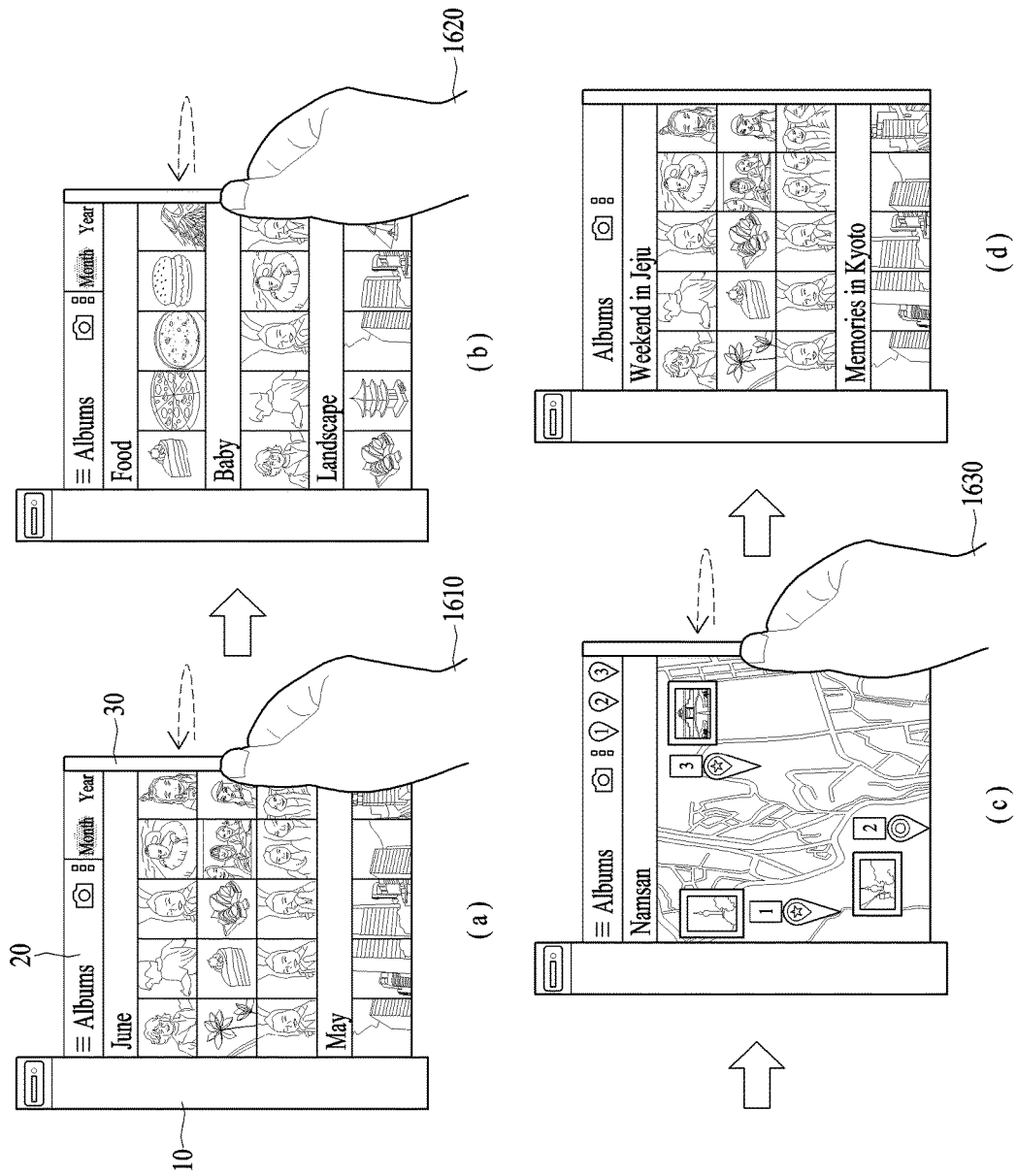
FIG. 16 is a diagram showing an example of while a gallery application is running, displaying at least one thumbnail image differently in response to an input signal for a flexible display in a mobile terminal according to one embodiment of the present invention.
Figure 17:
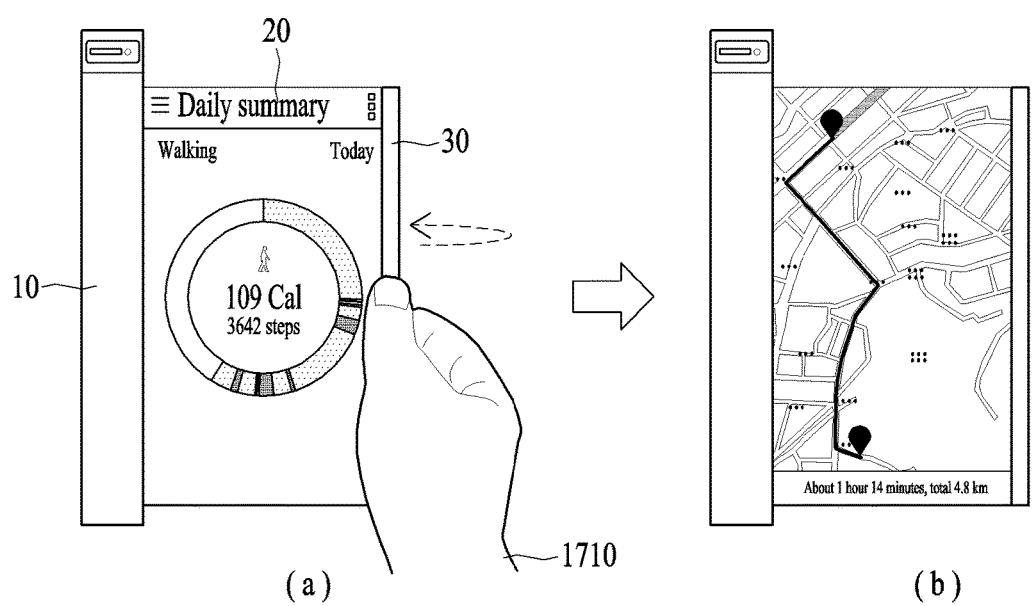
FIG. 17 is a diagram showing an example of while an exercise application is running, displaying an exercise content differently in response to an input signal for a flexible display in a mobile terminal according to one embodiment of the present invention.

Embodiments of FIGS. 14 to 17 show examples of applying the above embodiment of FIG. 13 to applications actually. Particularly, FIG. 14 and FIG. 15 show examples on a weather application, FIG. 16 shows an example on a gallery application, and FIG. 17 shows an example on an exercise application.

FIG. 14 is a diagram showing an example of while a weather application is running, displaying a weather content differently in response to an input signal for a flexible display in a mobile terminal according to one embodiment of the present invention.

Referring to FIG. 14 (*a*), in a state that a display unit 20 is extended by a predetermined length, a mobile terminal can display the weather of 'Seoul'. Particularly, if a weather application is launched in the state that the display unit 20 is extended by the predetermined length, the mobile terminal can display the weather of 'Seoul' on the display unit 20. Regarding this, the mobile terminal can sense an input signal for launching the weather application and an input signal for extending the display unit [Not shown in FIG. 14].

The mobile terminal can sense a first input signal 1410. Here, the first input signal 1410 may correspond to the same input as the former first input signal of FIG. 13. In this case, as shown in FIG. 14 (*b*), the mobile terminal can display the weather of 'Busan' on the display unit 20.

The mobile terminal can sense a second input signal 1420. Here, the second input signal 1420 may correspond to the same input as the former second input signal of FIG. 13. In this case, as shown in FIG. 14 (*c*), the mobile terminal can display the weather of 'Daegu' on the display unit 20.

Here, the weather of 'Busan' shown in FIG. 14 (*b*) or the weather of 'Daegu' shown in FIG. 14 (*c*) may correspond to information of the same hierarchy, grade, and concept as the weather of 'Seoul' shown in FIG. 14 (*a*). Namely, the weather of 'Seoul', the weather of 'Busan', and the weather of 'Daegu' have the common features in aspect of one city weather.

Meanwhile, if sensing an addition input signal, the mobile terminal may display the weather of a different city on the display unit 20 [Not shown in FIG. 14]. Although the above embodiment discloses that the weather per city is displayed according to an input signal, a displayed item may correspond to a different substance containing the common features.

FIG. 15 is a diagram showing an example of while a weather application is running, displaying a weather content differently in response to an input signal for a flexible display in a mobile terminal according to one embodiment of the present invention. The substance of the embodiment of FIG. 15 redundant with the description of FIG. 14 shall be omitted.

Referring to FIG. 15 (*a*), in a state that a display unit 20 is extended by a predetermined length, a mobile terminal can display the real-time weather of 'Seoul'. In doing so, the mobile terminal can sense a first input signal 1510. Here, the first input signal 1510 may correspond to the same input as the former first input signal of FIG. 13.

In this case, as shown in FIG. 15 (*b*), the mobile terminal can display 'nationwide weather' with reference to 'Seoul' on the display unit 20. In doing so, the mobile terminal may sense a second input signal 1520. Here, the second input signal 1520 may correspond to the same input as the former second input signal of FIG. 13. If so, as shown in FIG. 15 (*c*), the mobile terminal can display a life index of 'Seoul' on the display unit 20.

Here, 'real-time weather' of 'Seoul' shown in FIG. 15 (*a*) or 'nationwide weather' with reference to 'Seoul' shown in FIG. 15 (*b*), and 'life index' of 'Seoul' shown in FIG. 15 (*c*) may correspond to information of the same hierarchy, grade, and concept. Namely, the informations shown in FIGS. 15 (*a*) to 15 (*c*) contain the common features in aspect related to 'Seoul'.

Meanwhile, if sensing an addition input signal, the mobile terminal may display different weather information related to 'Seoul' on the display unit 20 [Not shown in FIG. 15]. Although the above embodiment teaches that the information related to the weather of 'Seoul' is displayed according to an input signal, a displayed item may correspond to a different weather content containing the common features.

FIG. 16 is a diagram showing an example of while a gallery application is running, displaying at least one thumbnail image differently in response to an input signal for a flexible display in a mobile terminal according to one embodiment of the present invention.

Referring to FIG. 16 (*a*), in a state that a display unit 20 is extended by a predetermined length, a mobile terminal can display at least one thumbnail image sorted by 'time'. Particularly, if a gallery application is launched in the state that the display unit 20 is extended by the predetermined length, the mobile terminal can display at least one thumbnail image sorted by 'time' on the display unit 20. For example, the mobile terminal can display thumbnail images by sorting photos taken for May and photos taken for June.

Moreover, the mobile terminal can sense a first input signal 1610. Here, the first input signal 1610 may correspond to the same input as the former first input signal of FIG. 13. In this case, as shown in FIG. 16 (*b*), the mobile terminal can display at least one thumbnail image sorted by 'theme' on the display unit 20. For example, the mobile terminal can display thumbnail images in a manner of sorting by photos related to food, photos related to dogs, photos related to friends, and the like on the display unit 20.

Moreover, the mobile terminal may sense a second input signal 1620. Here, the second input signal 1620 may correspond to the same input as the former second input signal of FIG. 13. If so, as shown in FIG. 16 (*c*), the mobile terminal can display at least one thumbnail image sorted by 'location' on the display unit 20. For example, referring to FIG. 16 (*c*), the mobile terminal displays a map on the display unit 20 and is then able to display a thumbnail image on a region corresponding to an image taken location.

Moreover, the mobile terminal can sense a third input signal 1630. Here, the third input signal 1630 may correspond to the same input as the first or second input signal 1610 or 1620. If so, as shown in FIG. 16 (*d*), the mobile terminal can display at least one thumbnail image sorted by 'event' on the display unit 20. For example, 'vent' may correspond to tour or memory.

Here, the image sorted by 'time' shown in FIG. 16 (*a*), the image sorted by 'theme' shown in FIG. 16 (*b*), the image sorted by 'location' shown in FIG. 16 (*c*), and the image sorted by 'event' shown in FIG. 16 (*d*) may correspond to information of the same hierarchy, grade, and concept. Namely, the image sorted by 'time', the image sorted by 'theme', the image sorted by 'location', and the image sorted by 'event' contain the common features in aspect of being sorted by specific themes.

Meanwhile, if sensing an addition input signal, the mobile terminal may display at least one thumbnail image sorted by a different theme on the display unit 20 [Not shown in FIG. 16].

FIG. 17 is a diagram showing an example of while an exercise application is running, displaying an exercise content differently in response to an input signal for a flexible display in a mobile terminal according to one embodiment of the present invention.

Referring to FIG. 17 (*a*), in a state that a display unit 20 is extended by a predetermined length, a mobile terminal can display an exercise amount of 'today'. Particularly, if an exercise application is launched in the state that the display unit 20 is extended by the predetermined length, the mobile terminal can display the exercise amount of 'today' on the display unit 20. Regarding this, the mobile terminal can sense an input signal for launching the exercise application and an input signal for extending the display unit [Not shown in FIG. 17].

Moreover, the mobile terminal can sense an input signal 1710. Here, the input signal 1710 may correspond to the same input as the former first or second input signal of FIG. 13. In this case, as shown in FIG. 17 (*b*), the mobile terminal can display an exercise route of 'today'.

Here, the exercise amount of 'today' shown in FIG. 17 (*a*) and the exercise route of 'today' shown in FIG. 17 may correspond to information of the same hierarchy, grade, and concept. Namely, the exercise amount of 'today' and the exercise route of 'today' are the information related to 'today' and correspond to a case that information types are different from each other.

Meanwhile, if sensing an addition input signal, the mobile terminal may display information of a different type related to 'today' on the display unit 20 [Not shown in FIG. 17]. Moreover, in the above embodiment, although exercise information of various types related to 'today' are displayed according to an input signal, the displayed information may correspond to different substance containing common features.

The following case is described with reference to FIGS. 18 to 22. First of all, in a state that a display unit is extended, after the display unit has been moved in one direction, if an input for returning the display unit to a previous location is sensed, a content is displayed on the display unit. Here, the one direction in which the display unit is moved in FIGS. 18 to 22 may correspond to a direction opposite to the former direction in which the display unit is moved in FIGS. 13 to 17.

Figure 18:
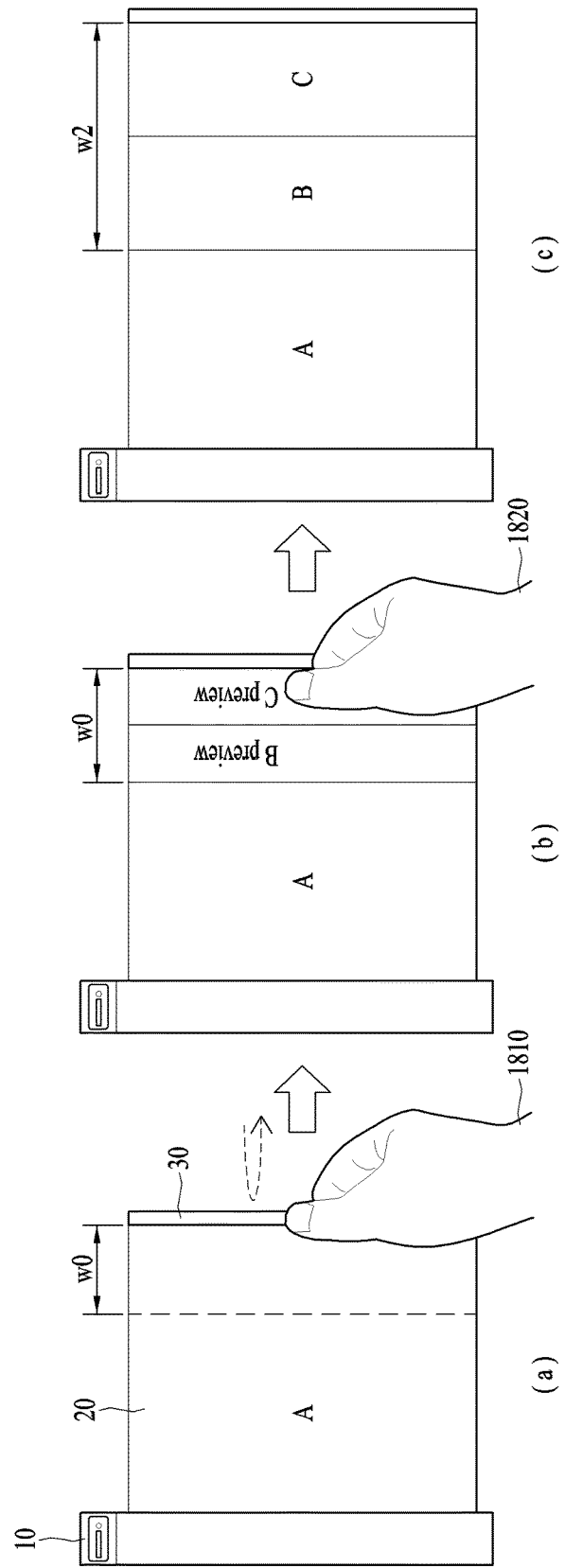
FIG. 18 is a diagram showing an example of displaying contents differently in response to an input signal for a flexible display unit in a mobile terminal according to one embodiment of the present invention.

FIG. 18 is a diagram showing an example of displaying contents differently in response to an input signal for a flexible display unit in a mobile terminal according to one embodiment of the present invention.

Referring to FIG. 18 (*a*), in a state that a display unit 20 is extended by a unit length and a first length w1, a mobile terminal can display a content A on the display unit 20. In doing so, the mobile terminal can sense a first input signal 1810. Here, the first input signal 1810 may correspond to an input of in a state that a portion of the display unit 20 or a holder 30 is touched, moving the display unit 20 in a direction having a body unit 10 located therein and then moving the display unit 20 in an opposite direction.

If so, as shown in FIG. 18 (*b*), the mobile terminal can display a preview of a content B, a preview of a content C and the content A on the display unit 20. Particularly, in response to the first input signal 1810, the mobile terminal can display the previews of the contents B and C on an area of the display unit 20 corresponding to the first length w1. In doing so, the content A can be displayed intactly on an area of the display unit 20 corresponding to the unit length.

Here, the types and number of contents displayed on the area corresponding to the first length w1 in response to the first input signal 1810 may vary depending on settings. For example, in response to the first input signal 1810, the mobile terminal may display previews of the contents B, C and D on the area corresponding to the first length w.

Referring to FIG. 18 (*b*), the mobile terminal may sense a second input signal 1820. Here, the second input signal 1820 may correspond to an input for extending the display unit by a second length w2. For example, the second input signal 1820 may correspond to an input of in a state that a portion of the display unit 20 or the holder 30 is touched, moving the display unit 20 in an increasing direction of a distance from the body unit 10. For example, the second input signal 1820 may correspond to an input to a soft or hardware key provided to the mobile terminal.

In this case, as shown in FIG. 18 (*c*), the mobile terminal can display the content B and the content C on the display unit 20. Particularly, in response to the second input signal 1820, the mobile terminal can display the content B and the content C on a region of the display unit 20 corresponding to the second length w2.

Meanwhile, the content A, the content B and the content C displayed on the display unit 20 may correspond to a screen running on the same application. And, the content A, the content B and the content C may correspond to the same hierarchy, concept, etc.

Moreover, in case that the length of the display unit 20 is extended over the length shown in FIG. 18 (*c*), the mobile terminal may not display contents other than the content A, the content B and the content C. Namely, in this case, the mobile terminal displays the content A, the content B and the content C on the display unit 20 in a manner of enlarging a size of each of the content A, the content B and the content C or adding the substance of the content A, the content B and the content C.

Figure 19:
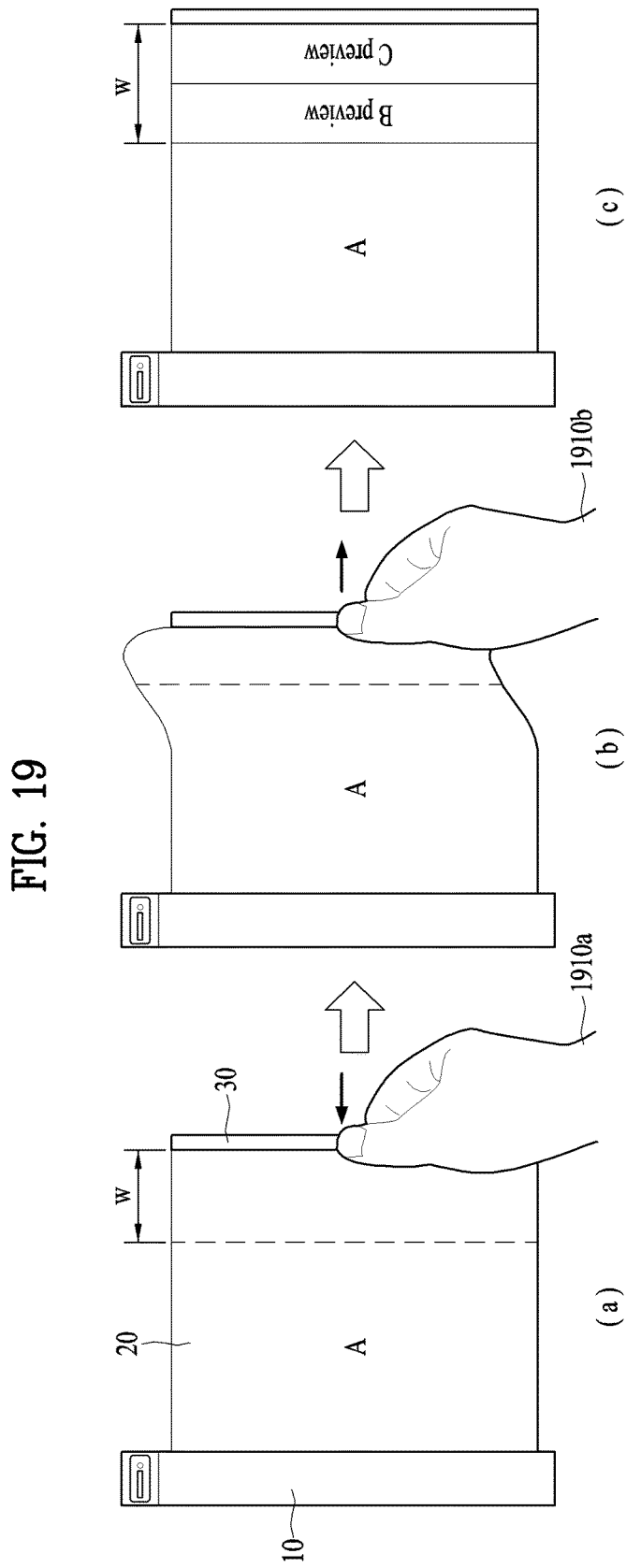
FIG. 19 is a diagram showing a change of a display unit in response to a first input signal mentioned in FIG. 18 in a mobile terminal according to one embodiment of the present invention.

FIG. 19 is a diagram showing a change of a display unit in response to a first input signal mentioned in FIG. 18 in a mobile terminal according to one embodiment of the present invention.

The substance of the embodiment of FIG. 19 redundant with the description of FIG. 18 shall be omitted. Moreover, in the embodiment of FIG. 19, a first input signal 1910*a* and a second input signal 1910*b* are consecutive input signals and may correspond to the former first input signal of FIG. 18.

Referring to FIG. 19 (*a*), in a state that a display unit 20 is extended by a unit length and a first length w1, a mobile terminal can display a content A on the display unit 20. In doing so, the mobile terminal can sense a first input signal 1910*a*. Here, the first input signal 1910*a* may correspond to an input of moving a portion of the display unit 20 in a direction toward a body unit 10. Moreover, the first input signal 1910*a* may correspond to an input of moving a holder 30 in a direction toward the body unit 10. For example, the first input signal 1910*a* may correspond to an input of folding a portion of the display unit 20 toward the body unit 10.

If so, as shown in FIG. 19 (*b*), in response to the first input signal 1910*a*, a portion of the display unit 20 may be bent in the mobile terminal. Moreover, in this case, as shown in FIG. 19 (*b*), the mobile terminal can display a portion of the content A on a region corresponding to the first length w.

Subsequently, the mobile terminal may sense a second input signal 1910*b*. Here, the second input signal 1910*b* is a signal consecutive to the first input signal 1910*a* and may correspond to an input of in a state that a portion of the display unit 20 is moved toward the body unit 10, returning to the original state.

In this case, the mobile terminal can display previews of a content B and a content C on the display unit 20. Namely, in response to the second in put signal 1910*b*, the mobile terminal can display the previews of the contents B and C on a region corresponding to the first length w. Meanwhile, in the embodiments shown in FIG. 19 (*a*) and FIG. 19 (*c*), the region of the display unit 20 is identical. For example, the region corresponding to the first length w may correspond to a moved or folded partial region of the display unit 20.

Figure 20:
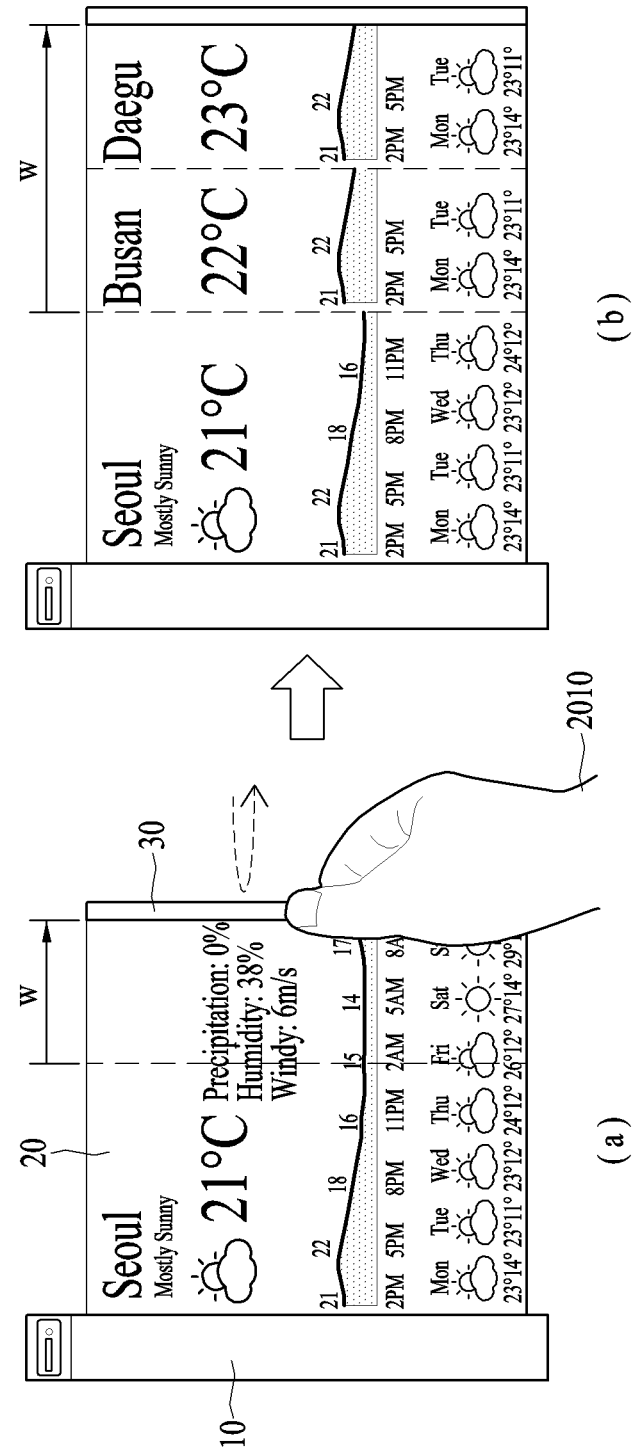
FIG. 20 is a diagram showing an example of while a weather application is running, displaying a weather content differently in response to an input signal for a flexible display in a mobile terminal according to one embodiment of the present invention.
Figure 21:
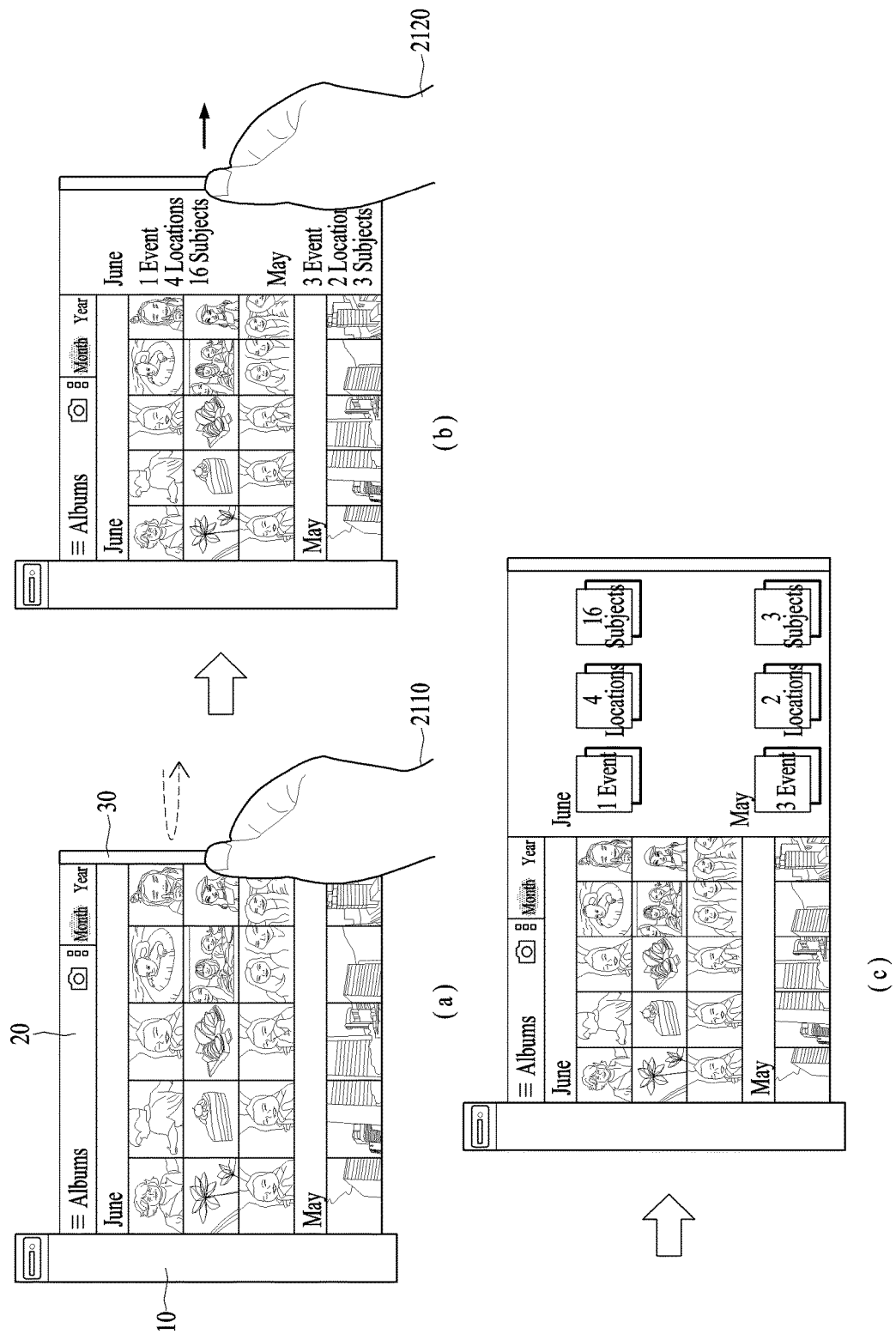
FIG. 21 is a diagram showing an example of while a gallery application is running, displaying an image content differently in response to an input signal for a flexible display in a mobile terminal according to one embodiment of the present invention.
Figure 22:
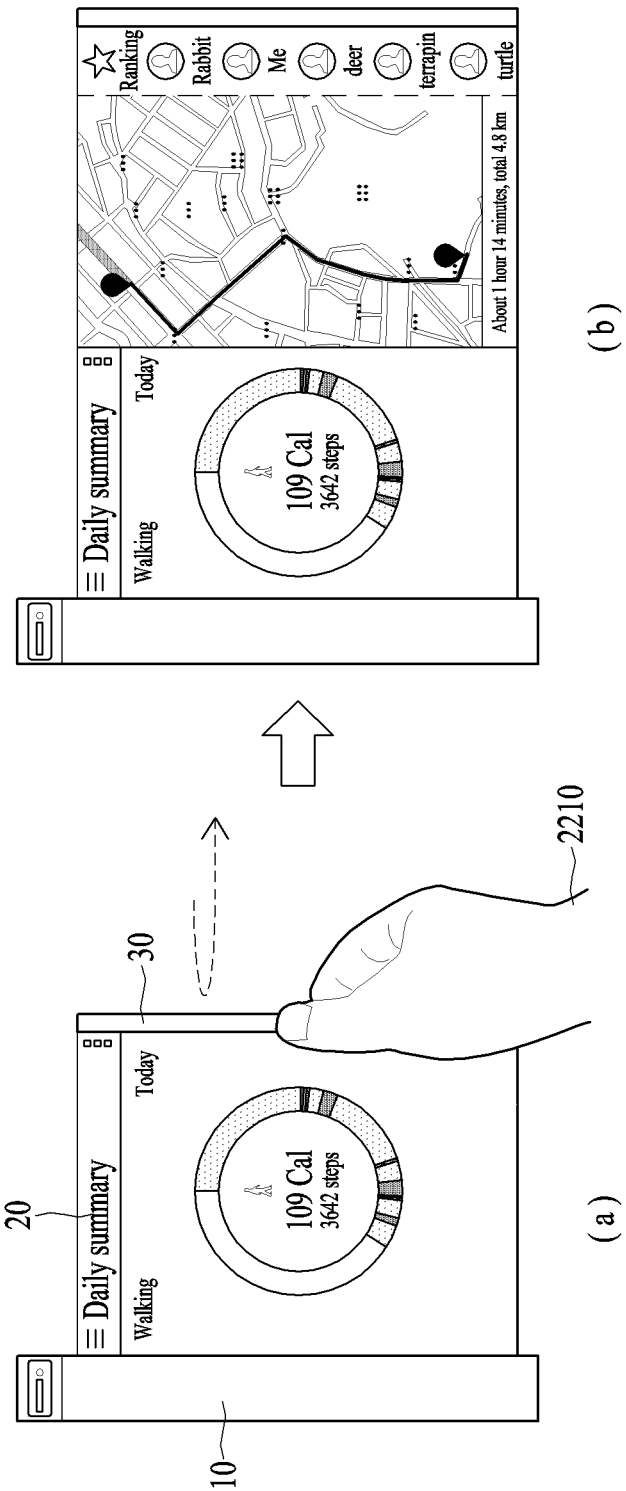
FIG. 22 is a diagram showing an example of while an exercise application is running, displaying an exercise content differently in response to an input signal for a flexible display in a mobile terminal according to one embodiment of the present invention.

Embodiments of FIGS. 20 to 23 show examples of applying the embodiments of FIG. 18 and FIG. 19 to an application actually. Particularly, FIGS. 20 to 22 show examples on a weather application, a gallery application and an exercise application, respectively.

FIG. 20 is a diagram showing an example of while a weather application is running, displaying a weather content differently in response to an input signal for a flexible display in a mobile terminal according to one embodiment of the present invention.

Referring to FIG. 20 (*a*), a mobile terminal can display the weather of 'Seoul' on a display unit 20 in a state extended by a predetermined length and a first length w. Particularly, if a weather application is launched in the state that the display unit 20 is extended by the predetermined length and the first length w, the mobile terminal can display the weather of 'Seoul' on the display unit 20. Regarding this, the mobile terminal can sense an input signal for launching the weather application and an input signal for extending the display unit [Not shown in FIG. 20].

In this case, the mobile terminal can sense an input signal 2010. Here, the input signal may correspond to the same input signal as the former first input signal of FIG. 18. In this case, as shown in FIG. 20 (*b*), the mobile terminal can display a preview of the weather of 'Busan' and a preview of the weather of 'Daegu' on the display unit 20. Here, the preview of the weather of 'Busan' and the preview of the weather of 'Daegu' may be displayed on a region of the display unit 20 corresponding to the first length w.

In response to the input signal 2010, as the preview of the weather of 'Busan' and the preview of the weather of 'Daegu' are displayed, a size of a region on which the weather of 'Seoul' is displayed is reduced. For example, in response to the input signal 2010, the mobile terminal can reduce and display the weather of 'Seoul' on an area corresponding to the unit length. For example, in response to the input signal 2010, the mobile terminal can display a portion of the weather of 'Seoul' on an area corresponding to the unit length only.

Moreover, the preview of the weather of 'Busan' and the preview of the weather of 'Daegu' may correspond to a case of displaying a portion of the whole weather information only. For example, as shown in FIG. 20 (*b*), the preview of the weather of 'Busan' or the preview of the weather of 'Daegu' may display a current temperature, Monday weather and Tuesday weather only.

Moreover, the weather of 'Seoul', the weather of 'Busan' and the weather of 'Daegu' may correspond to information of the same hierarchy, grade, and concept. Namely, the weather of 'Seoul', the weather of 'Busan', and the weather of 'Daegu' have the common features in aspect of one city weather.

Meanwhile, if sensing an addition input signal for extending the display unit, the mobile terminal may provide the whole information of the weather of 'Busan' and the weather of 'Daegu' as well as the weather of 'Seoul' [Not shown in FIG. 20]. Moreover, the case of the above embodiment corresponds to a case that the number of the additionally provided informations is set to 2. And, it is possible to set information to be provided variously in response to an input signal.

FIG. 21 is a diagram showing an example of while a gallery application is running, displaying an image content differently in response to an input signal for a flexible display in a mobile terminal according to one embodiment of the present invention.

Referring to FIG. 21 (*a*), a mobile terminal can display at least one thumbnail image corresponding to captured images of 'month unit on a display unit 20 in a state extended by a predetermined length and a first length w. Particularly, if a gallery application is launched in the state that the display unit 20 is extended by the predetermined length and the first length w, the mobile terminal can display the at least one thumbnail image corresponding to captured images of 'month unit on the display unit 20. Regarding this, the mobile terminal can sense an input signal for launching the gallery application and an input signal for extending the display unit [Not shown in FIG. 21].

In this case, the mobile terminal can sense a first input signal 2110. Here, the first input signal 2110 may correspond to the same input signal as the former first input signal of FIG. 18. In this case, as shown in FIG. 21 (*b*), the mobile terminal can display the at least one thumbnail image corresponding to captured images of 'month unit and summary information of the captured image of 'month unit' on the display unit 20. Here, the summary information of the captured image of 'month unit' may be displayed on a region of the display unit 20 corresponding to the first length w.

In response to the first input signal 2110, a size of a region on which the at least one thumbnail image corresponding to captured images of 'month unit is displayed is reduced. For example, in response to the first input signal 2110, the mobile terminal can reduce and display the at least one thumbnail image corresponding to captured images of 'month unit on an area corresponding to the unit length. For example, in response to the first input signal 2110, the mobile terminal can display a portion of the at least one thumbnail image corresponding to captured images of 'month unit on an area corresponding to the unit length only.

Referring to FIG. 21 (*b*), the mobile terminal can sense a second input signal 2120. Here, the second input signal 2120 may correspond to the same input signal as the former first input signal of FIG. 18. In this case, as shown in FIG. 21 (*c*), the mobile terminal can display the at least one thumbnail image corresponding to captured images of 'month unit and information of the captured images of 'month unit' on the display unit 20.

In response to a length of the second input signal 2120, an area on which the information of the captured images of 'month unit' is displayed can be increased. Moreover, the information of the captured images of 'month unit' may correspond to information for additionally displaying a menu option for checking each detailed information in comparison with the summary information of the captured images of 'month unit' shown in FIG. 21 (*b*).

Meanwhile, the at least one thumbnail image corresponding to the captured images of 'month unit shown in FIG. 21 and the information of the captured images of 'month unit' may correspond to information of the same hierarchy, grade, and concept. And, the at least one thumbnail image corresponding to the captured images of 'month unit and the information of the captured images of 'month unit' include the common features in aspect of the contents related to the captured images of 'month unit' all.

Meanwhile, if sensing an addition input signal for extending the display unit, the mobile terminal may provide information related to the captured images of 'month unit'. [Not shown in FIG. 21]. Moreover, the case of the above embodiment corresponds to a case that the number of the additionally provided information is set to 1. And, it is possible to set information to be provided variously in response to an input signal.

FIG. 22 is a diagram showing an example of while an exercise application is running, displaying an exercise content differently in response to an input signal for a flexible display in a mobile terminal according to one embodiment of the present invention.

Referring to FIG. 22 (*a*), a mobile terminal can display an exercise amount of 'today' on a display unit 20 in a state extended by a unit length. Regarding this, the mobile terminal can sense an input signal for launching an exercise application and an input signal for extending the display unit by the unit length [Not shown in FIG. 22].

In this case, the mobile terminal can sense an input signal 2210. Here, the input signal 2210 may correspond to a signal including the first and second input signals mentioned in FIG. 18. Namely, the input signal 2210 may correspond to an input of in a state that a portion of the display unit 20 or a holder 30 is touched, moving the display unit shortly in a direction having a body unit located therein and then moving the display unit 20 long in an opposite direction. For example, a moving length in the opposite direction may be greater than a moving length in the body unit located direction.

In this case, as shown in FIG. 22 (*b*), the mobile terminal can display an exercise amount of 'today', an exercise route of 'today', and an exercise ranking of 'today' on the display unit 20. Moreover, the exercise amount of 'today', the exercise route of 'today', and the exercise ranking of 'today', which are shown in FIG. 22 (*b*), may correspond to information of the same hierarchy, grade and level. Namely, the exercise amount of 'today', the exercise route of 'today', and the exercise ranking of 'today' have the common features in aspect of the information related to the exercise taken 'today'.

Moreover, the case of the above embodiment corresponds to a case that the number of the additionally provided informations is set to 2. And, it is possible to set information to be provided variously in response to an input signal.

Figure 23:
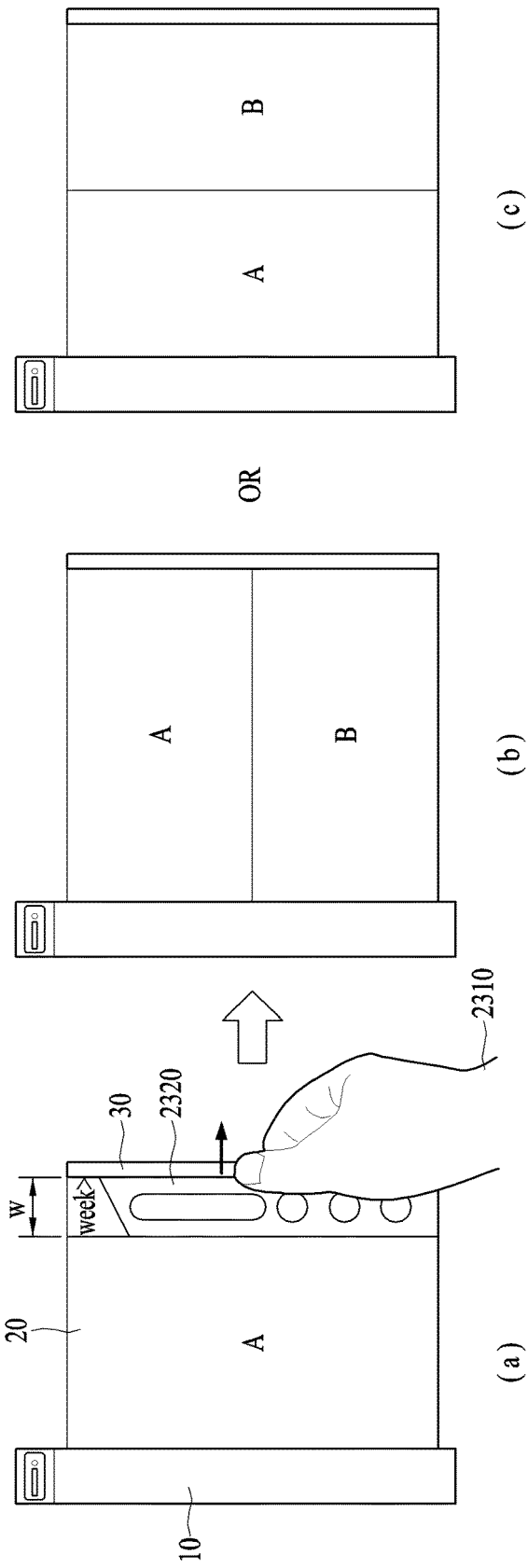
FIG. 23 is a diagram showing an example of displaying a content differently in response to a location of an input signal for a flexible display unit in a mobile terminal according to one embodiment of the present invention.
Figure 24:
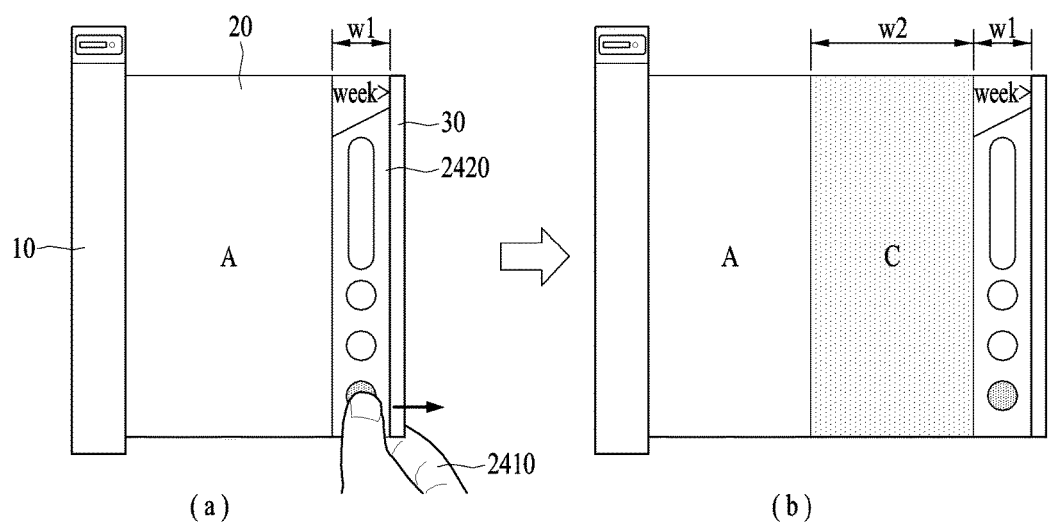
FIG. 24 is a diagram showing an example of displaying a content differently in response to a location of an input signal for a flexible display unit in a mobile terminal according to one embodiment of the present invention.

In the following, FIG. 23 and FIG. 24 show examples of a content provided in case of extending a display unit, according to an input signal sensed location.

FIG. 23 is a diagram showing an example of displaying a content differently in response to a location of an input signal for a flexible display unit in a mobile terminal according to one embodiment of the present invention.

Referring to FIG. 23 (*a*), a mobile terminal can display a content A and a controller 2320 on a display unit 20 in a state extended by a unit length and a first length w. In doing so, the mobile terminal can sense an input signal. Here, the input signal 2310 may correspond to an input for extending the display unit 20 in a state of touching a holder 30.

If so, in response to the input signal 2310, the mobile terminal can display the content A and a content B on the display unit 20. In this case, the mobile terminal can display the content A and the content B by partitioning a region of the display unit 20 in various ways. Yet, the present embodiment is non-limited by the above description. And, it is possible to display other contents as well as the contents A and B in response to the input signal 2310.

For example, referring to FIG. 23 (*b*), the mobile terminal partitions a region of the display unit 20 horizontally, thereby displaying the content A and the content B on the top and the bottom, respectively. For another example, referring to FIG. 23 (*c*), the mobile terminal partitions a region of the display unit 20 vertically, thereby displaying the content A and the content B on the left side and the right side, respectively. Yet, the content displaying method by partitioning the region of the display unit 20 is non-limited by the above description.

FIG. 24 is a diagram showing an example of displaying a content differently in response to a location of an input signal for a flexible display unit in a mobile terminal according to one embodiment of the present invention.

Particularly, FIG. 24 shows that a content displayed on an extended region is determined depending on a point from which a touch input for extending a display unit is sensed.

Referring to FIG. 24 (*a*), a mobile terminal can display a content A and a controller 2420 on a display unit 20 in a state extended by a unit length and a first length w. Particularly, the mobile terminal may display the content A and the controller 2420 on a region of the display unit 20 corresponding to the unit length and a region of the display unit 20 corresponding to the first length w1, respectively.

In doing so, the mobile terminal can sense an input signal 2410. Here, the input signal 2410 may correspond to an input for extending the display unit 20 in a state that a menu option in the controller 2420 is touched. For example, the touched menu option in the controller 2420 may correspond to an option for displaying a content C.

In this case, referring to FIG. 24 (*b*), in response to the input signal 2410, the mobile terminal can display the content A, the content C and the controller 2420 on the display unit 20. Particularly, the mobile terminal can display the content C on a region corresponding to a second length w2 by being extended in response to the input signal 2410.

Although the embodiment of FIG. 24 (*b*) discloses that the controller 2420 keeps being displayed on the display unit 20, it may be possible to remove or delete the controller 2420 from the controller 20.

Figure 25:
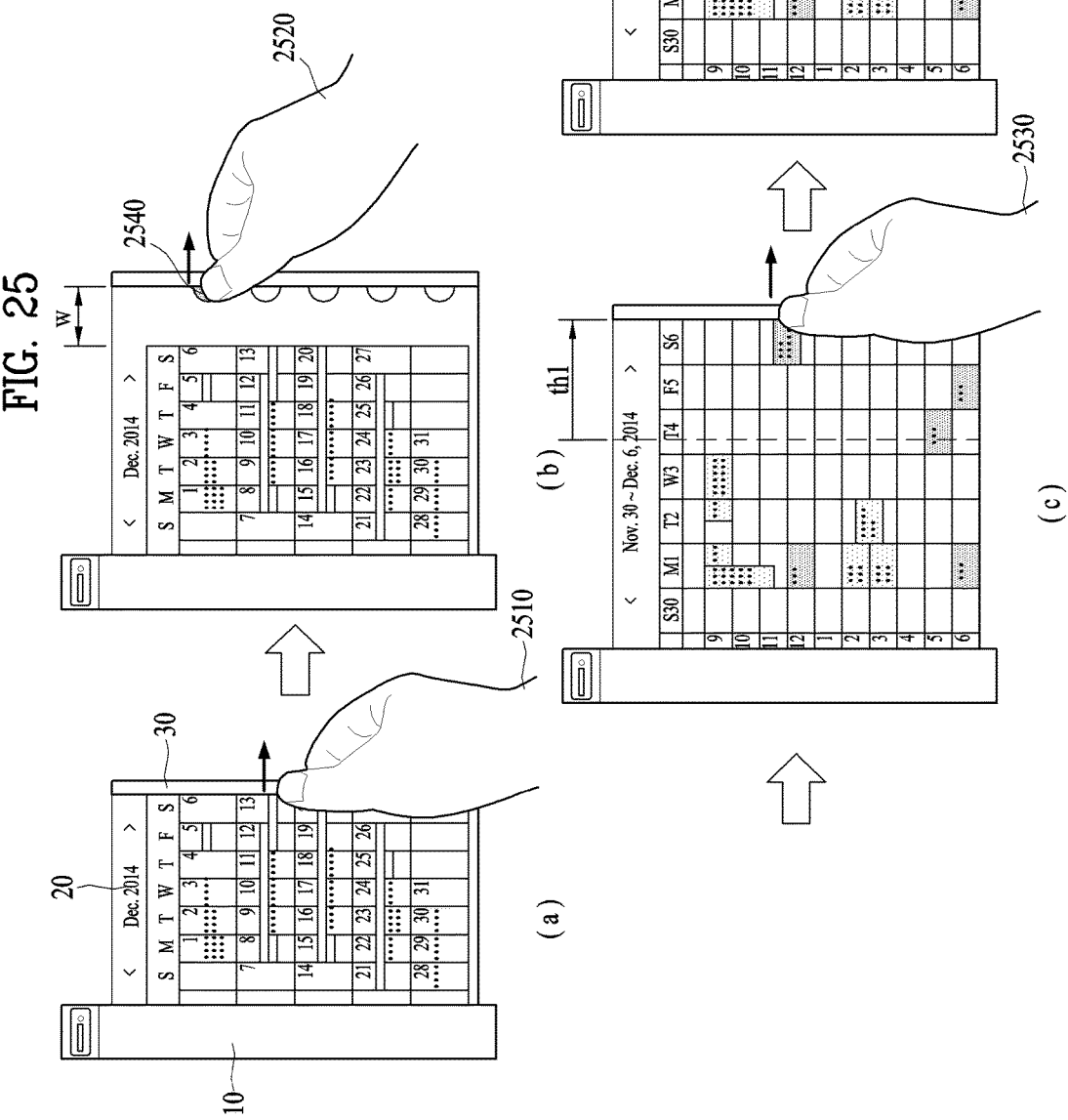
FIG. 25 is a diagram showing an example of if a calendar application is launched, displaying a content in response to an input signal for a flexible display unit in a mobile terminal according to one embodiment of the present invention.
Figure 26:
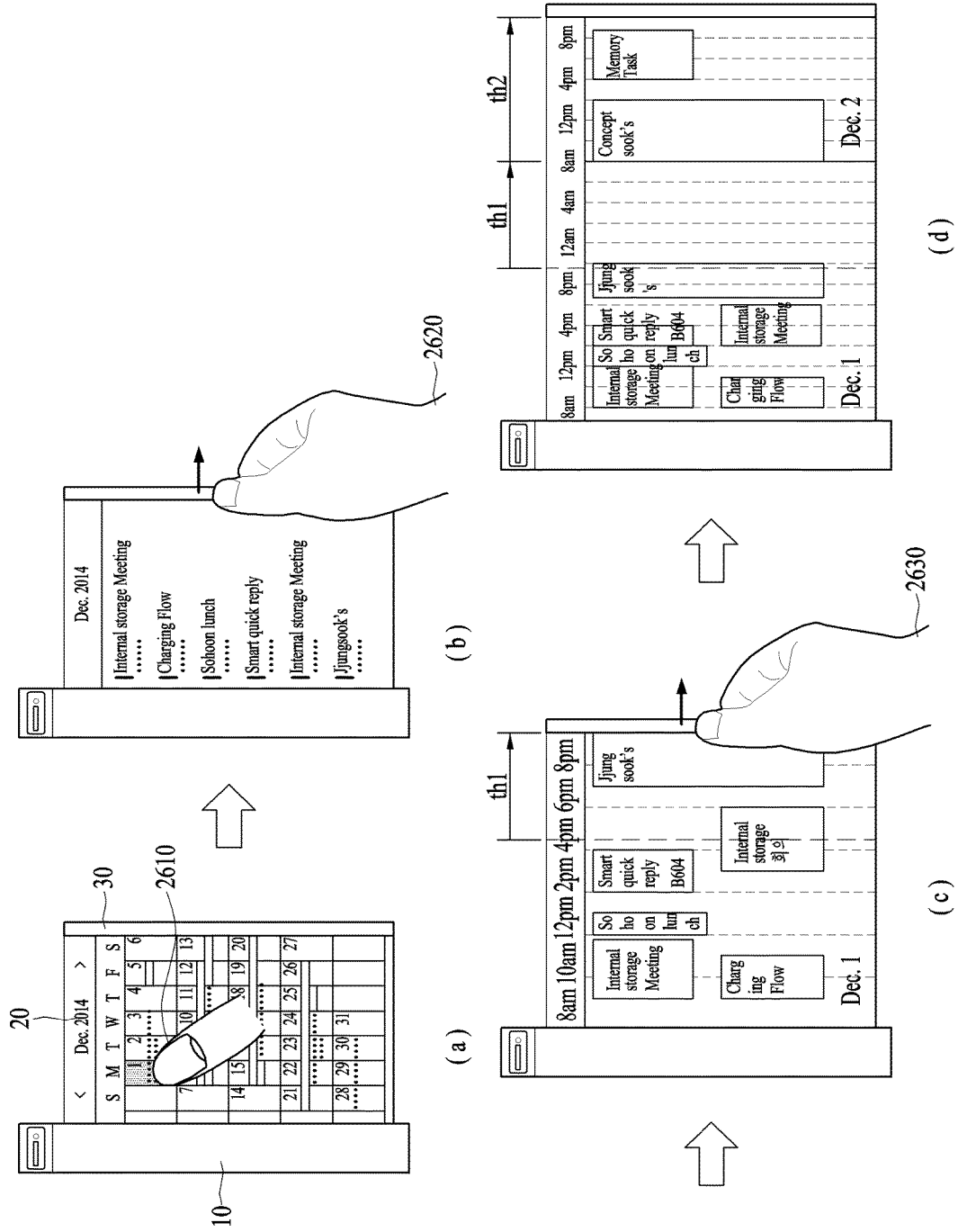
FIG. 26 is a diagram showing an example of if a calendar application is launched, displaying a content in response to an input signal for a flexible display unit in a mobile terminal according to one embodiment of the present invention.

FIGS. 25 to 27 show examples of if a calendar application is launched in a state that a display unit of a mobile terminal is extended by a unit length, displaying various sub-contents in response to an input signal. Here, the calendar application may include one of various applications (e.g., diary, scheduler, calendar, etc.) for managing schedules.

FIG. 25 is a diagram showing an example of if a calendar application is launched, displaying a content in response to an input signal for a flexible display unit in a mobile terminal according to one embodiment of the present invention.

Referring to FIG. 25 (a), in a state that a display unit 20 is extended by a unit length, a mobile terminal can display a 'monthly' content. Regarding this, the mobile terminal can sense an input signal for launching a calendar application before the 'monthly' content is displayed [not shown in FIG. 25].

In this case, the mobile terminal can sense a first input signal 2510. Here, the first input signal 2510 may correspond to an input for extending the display unit 20 by a first length w. And, the first length w may correspond to a length shorter than a first preset length th1. In this case, as shown in FIG. 25 (b), the mobile terminal extends the display unit 20 by the first length w and displays at least one menu option 2540 on a region corresponding to the first length w. Here, the at least one menu option 2540 may correspond to an icon corresponding to a 'weekly' content of the 'monthly' content.

Subsequently, the mobile terminal can sense a second input signal 2520. Here, the second input signal 2520 may correspond to an input for extending the display unit 20 by a first preset length th1 from the unit length. And, the second input signal 2520 may correspond to an input for extending the display unit 20 in a state that a touch to a menu option corresponding to a first week in the at least one or more menu options 2540 is sensed.

If so, as shown in FIG. 25 (c), the mobile terminal can display a 'weekly' content of the first week in the 'monthly' content. Particularly, in response to the second input signal 2520, the mobile terminal can display an hourly schedule of the first week on the display unit.

The mobile terminal can sense a third input signal 2530. Here, the third input signal 2530 may correspond to an input for extending the display unit 20 by a second preset length th2 in the state that the display unit 20 is extended by the unit length and the first preset length th1. And, the third input signal 2530 may correspond to an input for extending the display unit 20 in a state that a touch to a holder 30 is sensed.

If so, as shown in FIG. 25 (d), the mobile terminal can display a 'daily' content of 1 day in the 'weekly' content. Particularly, in response to the third input signal 2530, the mobile terminal can display a schedule of 'December 1' on a region of the display unit 20 corresponding to the second preset length th2.

FIG. 26 is a diagram showing an example of if a calendar application is launched, displaying a content in response to an input signal for a flexible display unit in a mobile terminal according to one embodiment of the present invention. The substance of the embodiment of FIG. 26 redundant with the description of FIG. 25 shall be omitted.

Referring to FIG. 26 (a), in a state that a display unit 20 is extended by a unit length, a mobile terminal can display a 'monthly' content. In this case, the mobile terminal can sense a first input signal 2610. Here, the first input signal 2610 may correspond to an input for selecting a specific date from the displayed 'monthly' content. For example, the first input signal 2610 may correspond to a touch input. In this case, as shown in FIG. 26 (b), the mobile terminal can display a schedule list of the first input signal sensed date on the display unit 20.

In doing so, the mobile terminal can sense a second input signal 2620. Here, the second input signal 2620 may correspond to an input for extending the display unit 20 in a state that a touch to a holder 30 is sensed. Moreover, the second input signal 2620 may correspond to an input for extending the display unit 20 by a first preset length th1 in the state extended by the unit length. In this case, as shown in FIG. 26 (c), the mobile terminal can display a schedule list of the first input signal sensed date in form of a time line.

The mobile terminal can sense a third input signal 2630. Here, the third input signal 2630 may correspond to an input for extending the display unit 20 in a state that a touch to the holder 30 is sensed. Moreover, the third input signal 2630 may correspond to an input for extending the display unit 20 by a second preset length th2 in the state extended by the unit length and the first preset length th1. In this case, as shown in FIG. 26 (d), the mobile terminal can display a schedule list of a date next to the first input signal sensed date on a region corresponding to the second preset length th2 in form of a time line.

If an additional input signal for extending the display unit is sensed, the mobile terminal may additionally display a schedule list of a next date in form of a time line [Not shown in FIG. 26].

FIG. 27 is a diagram showing an example of if a calendar application is launched, displaying a content in response to an input signal for a flexible display unit in a mobile terminal according to one embodiment of the present invention.

Referring to FIG. 27 (a), in a state that a display unit 20 is extended by a unit length, a mobile terminal can display a 'monthly' content. In this case, the mobile terminal can sense a first input signal 2710. Here, the first input signal 2710 may correspond to an input for selecting a specific date from the displayed 'monthly' content. For example, the first input signal 2710 may correspond to a touch input. In this case, as shown in FIG. 27 (b), the mobile terminal can display a schedule list of the first input signal sensed date.

In doing so, the mobile terminal can sense a second input signal 2720. Here, the second input signal 2720 may correspond to an input for selecting at least one schedule included in the schedule list. In this case, as shown in FIG. 27 (c), the mobile terminal can display a detailed view of the second input signal sensed schedule.

The mobile terminal can sense a third input signal 2730. Here, the third input signal 2730 may correspond to an input for extending the display unit 20 in a state that a touch to the holder 30 is sensed. In this case, as shown in FIG. 27 (d), the mobile terminal can display a schedule list of a date containing the first input signal sensed schedule on the display unit 20 in form of a time line.

If an additional input signal for extending the display unit is sensed, the mobile terminal may additionally display a schedule list of a next date in form of a time line [Not shown in FIG. 27].

Figure 28:
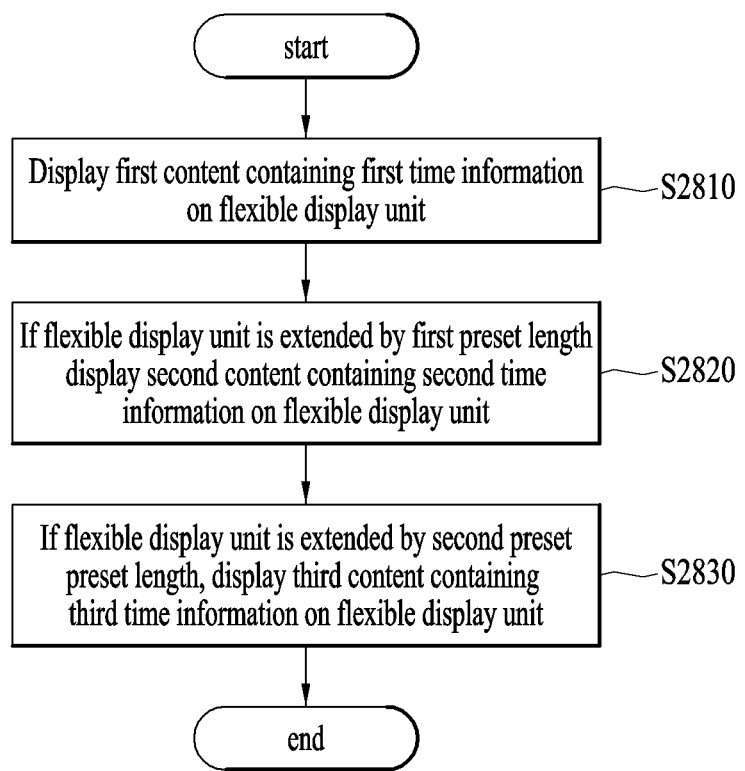
FIG. 28 is a flowchart showing a method of controlling a mobile terminal related to the present invention.

FIG. 28 is a flowchart showing a method of controlling a mobile terminal related to the present invention. The respective steps described with reference to FIG. 28 can be controlled by the controller of the mobile terminal shown in FIG. 1A.

First of all, a mobile terminal can display a first content containing first time information on a flexible display unit [S2810]. For example, the first content containing the first time information may include a running screen of a weather application, a running screen of an exercise application, a running screen of a payment application, a running screen of a calendar application, a running screen of a gallery application and the like.

Subsequently, if the flexible display unit is extended by a first preset length, the mobile terminal can display a second content containing second time information on the flexible display unit [S2820]. Meanwhile, as described in FIG. 6, if the flexible display unit is extended by a first length shorter than the first preset length, the mobile terminal can display the first content containing the first time information. Moreover, as described in FIG. 7, if the flexible display unit is extended by the first length shorter than the first preset length, the mobile terminal can additionally display at least one menu option for controlling the first content on the flexible display unit.

Thereafter, if the flexible display unit is extended by a second preset length, the mobile terminal can display a third content containing third time information on the flexible display unit [S2830].

With respect to this, as described in FIG. 5, the first to third contents may correspond to screens running on the same application. Yet, the first to third contents may include different time informations, respectively. For example, the second time information of the second content may correspond to time information of the concept higher than that of the first time information of the first content. Moreover, for example, the third time information of the third content may correspond to time information of the concept higher than that of the second information of the second content.

Figure 29:
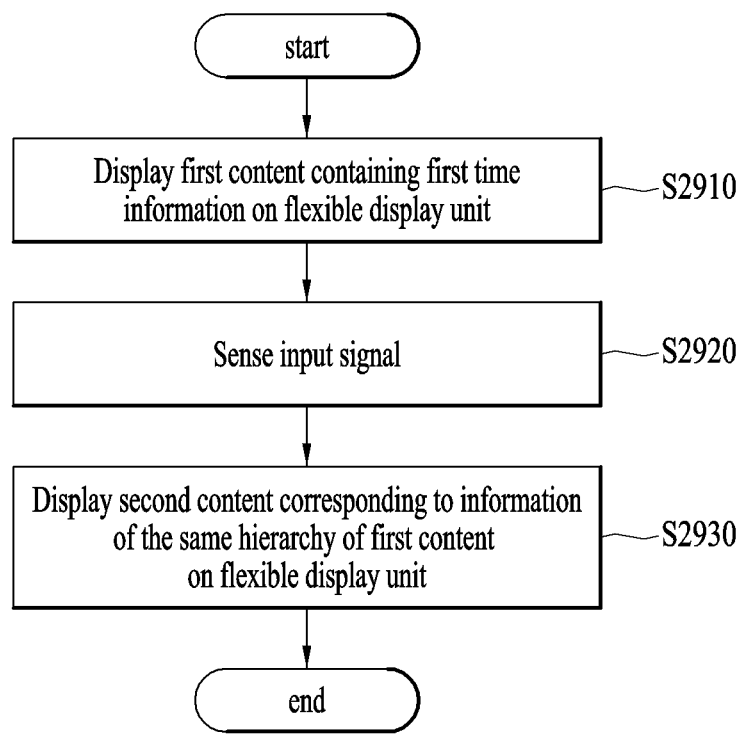
FIG. 29 is a flowchart showing a method of controlling a mobile terminal related to the present invention.

FIG. 29 is a flowchart showing a method of controlling a mobile terminal related to the present invention. The respective steps described with reference to FIG. 29 can be controlled by the controller of the mobile terminal shown in FIG. 1A. And, the substance of the embodiment of FIG. 29 redundant with the description of FIG. 28 shall be omitted.

First of all, a mobile terminal can display a first content containing first time information on a flexible display unit [S2910]. As described in FIG. 13, in a state that the flexible display unit is extended by a predetermined length, the mobile terminal can display the first content. For example, the state extended by the predetermined length may include a state that the display unit is extended by a unit length, a state that the display unit is extended by the unit length and a first preset length, and a state that the display unit is extended by the unit length, the first preset length and a second preset length.

Subsequently, the mobile terminal can sense an input signal [S2920]. As described in FIG. 13, the input signal may correspond to an input of in a state that a portion of the flexible display unit or a holder is touched, moving the flexible display unit in a direction getting away from a body unit and then moving the flexible display unit in an opposite direction.

Finally, the mobile terminal can display a second content corresponding to information of the same hierarchy of the first content on the flexible display unit [S2930]. Here, the second content may correspond to a screen running on the same application of the first content.

Figure 30:
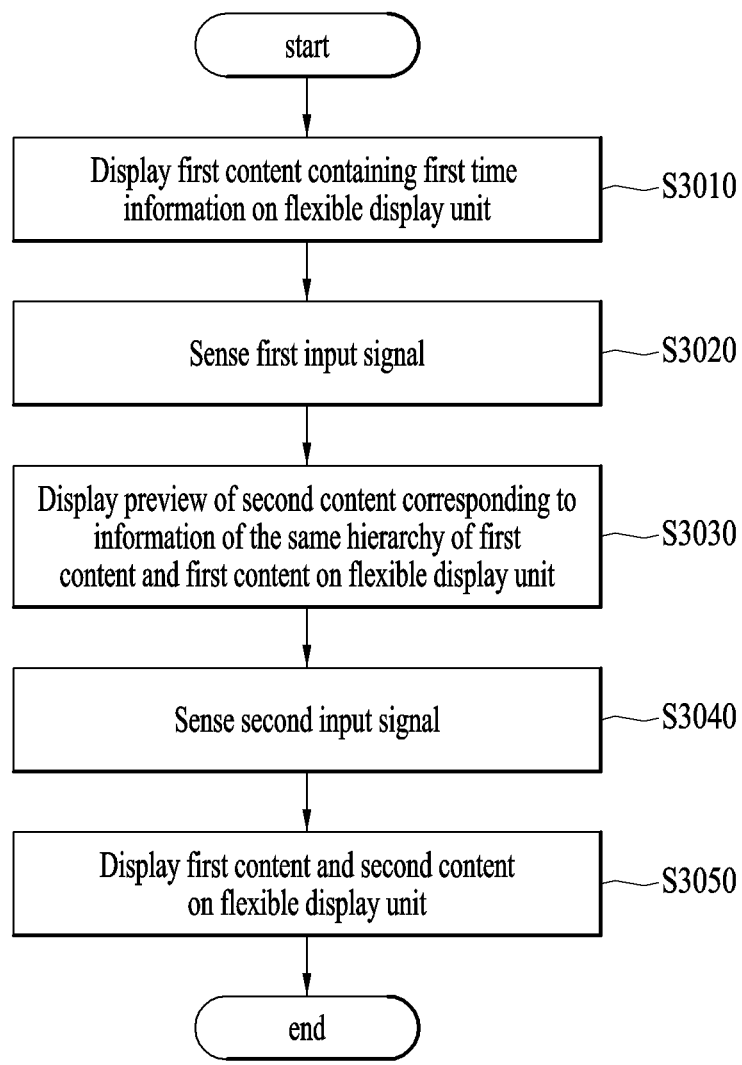
FIG. 30 is a flowchart showing a method of controlling a mobile terminal related to the present invention.

FIG. 30 is a flowchart showing a method of controlling a mobile terminal related to the present invention. The respective steps described with reference to FIG. 30 can be controlled by the controller of the mobile terminal shown in FIG. 1A. And, the substance of the embodiment of FIG. 30 redundant with the description of FIG. 28 shall be omitted.

First of all, a mobile terminal can display a first content containing first time information on a flexible display unit [S3010].

Subsequently, the mobile terminal can sense a first input signal [S3020]. As described in FIG. 18, the first input signal may correspond to an input of in a state that a portion of the flexible display unit or a holder 30 is touched, moving the flexible display unit in a direction having a body unit located therein and then moving the flexible display unit in an opposite direction.

Subsequently, the mobile terminal can display a preview of a second content corresponding to information of the same hierarchy of the first content and the first content on the flexible display unit [S3030]. As described in FIG. 18, the mobile terminal can display the preview of the second content on a region of the flexible display unit corresponding to the first input signal.

Thereafter, the mobile terminal can sense a second input signal [S3040]. Here, the second input signal may correspond to an input for extending the flexible display unit.

Finally, the mobile terminal can display the first content and the second content on the flexible display unit [S3050].

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

INDUSTRIAL APPLICABILITY

The present invention has industrial applicability in a mobile terminal and is repetitively applicable.

What is claimed is:

1. A mobile terminal, comprising:
a flexible display unit;
a sensing unit sensing an extension length of the flexible display unit and an input signal; and
a controller configured to:
display a first content including a first time information on the flexible display unit, and
if the flexible display unit is extended by a first preset length, display a second content including a second time information on the flexible display unit,
wherein the first content and the second content comprise running screens provided in the course of running a same application, and
wherein the first time information and the second time information are different from each other.

2. The mobile terminal of claim 1, wherein the controller is configured to display the first content in a state that the flexible display unit is extended by a unit length.

3. The mobile terminal of claim 1, wherein the second time information corresponds to a time information of hierarchy higher than that of the first time information.

4. The mobile terminal of claim 2, wherein if the flexible display unit is extended in the unit-length extended state, the controller is configured to display an additional content related to the first content on a region corresponding to the first length.

5. The mobile terminal of claim 1, wherein if the flexible display unit is extended by a second preset length, the controller is further configured to display a third content including a third time information on the flexible display unit, wherein the first to third contents comprise running screens provided in the course of running a same application, and wherein the third time information is different from each of the first information and the second time information.

6. The mobile terminal of claim 1, further comprising:
a body unit; and
a holder provided to one side of the flexible display unit.

7. The mobile terminal of claim 6, wherein the controller is further configured to sense a first input signal in a state that the first content is displayed and display a fourth content including the first time information on the flexible display unit in response to the first input signal and wherein the first content and the fourth content comprise contents including time information of a same hierarchy as running screens of a same application, respectively.

8. The mobile terminal of claim 7, wherein the first input signal comprises an input of increasing a distance from the body unit to the holder and then decreasing the distance.

9. The mobile terminal of claim 6, wherein the controller is further configured to sense a second input signal in the state that the first content is displayed and display the first content and a preview of at least one content including the first time information on the flexible display unit in response to the second input signal and wherein the first content and the at least one content comprise contents including time information of a same hierarchy as running screens of a same application, respectively.

10. The mobile terminal of claim 9, wherein the controller is configured to display a portion of the first content on the flexible display unit or displays the first content by reducing the first content, in response to the second input signal.

11. The mobile terminal of claim 9, wherein the second input signal includes a third input signal for decreasing a distance from the body unit to the holder and a fourth input signal for increasing the distance from the body unit to the holder.

12. The mobile terminal of claim 11, wherein the controller is configured to display the preview of the at least one content on a region of the flexible display unit corresponding to the third input signal in response to the second input signal.

13. The mobile terminal of claim 9, wherein the controller is further configured to sense a third input signal in a state that the first content and the preview of the at least one content are displayed and display the first content and the at least one content on the flexible display unit in response to the third input signal and wherein the at least one content is displayed on a region corresponding to a length extended in response to the third input signal.

14. The mobile terminal of claim 2, wherein if the flexible display unit is extended by a first length in the unit-length extended state, the controller is further configured to display at least one menu option for controlling the first content on a region corresponding to the first length.

15. The mobile terminal of claim 14, wherein the controller is further configured to determine a content to display on the flexible display unit based on a location from which a fourth input signal for the first length extension is sensed.

16. The mobile terminal of claim 15, wherein if the fourth input signal for the first length extension is sensed from a first option among the at least one menu option, the controller is further configured to display a content corresponding to the first option on the flexible display unit.

17. The mobile terminal of claim 16, wherein the content corresponding to the first option corresponds to a content of a lower hierarchy of the first content.

18. A method of controlling a mobile terminal including a flexible display unit, comprising:
displaying a first content including a first time information on the flexible display unit; and
if the flexible display unit is extended by a first preset length, displaying a second content including a second time information on the flexible display unit,
wherein the first content and the second content comprise running screens provided in the course of running a same application and
wherein the first time information and the second time information are different from each other.

19. The method of claim 18, further comprising displaying the first content in a state that the flexible display unit is extended by a unit length.

20. The method of claim 18, wherein the second time information corresponds to a time information of hierarchy higher than that of the first time information.

* * * * *